(12) United States Patent
Siddiqi et al.

(10) Patent No.: US 12,504,810 B2
(45) Date of Patent: Dec. 23, 2025

(54) METHOD AND SYSTEM FOR REMOTE CLINICIAN MANAGEMENT OF HEAD-MOUNTED VISION ASSIST DEVICES

(71) Applicant: Irisvision, Inc., Pleasanton, CA (US)

(72) Inventors: Ahmad Farhad Siddiqi, Torrance, CA (US); Dino De Cicco, Pleasanton, CA (US); Jordan Gellatly, Redondo Beach, CA (US); Umair Farooq, Rawalpindi (PK); Syed Abbas Abid, Rawalpindi (PK); Syed Qamar Abbas, Rawalpindi (PK)

( * ) Notice: Subject to any disclaimer, the term of this patent is extended or adjusted under 35 U.S.C. 154(b) by 0 days.

(21) Appl. No.: 17/643,414

(22) Filed: Dec. 8, 2021

(65) Prior Publication Data

US 2022/0171456 A1 Jun. 2, 2022

Related U.S. Application Data

(63) Continuation-in-part of application No. 17/202,748, filed on Mar. 16, 2021, now Pat. No. 11,372,479,
(Continued)

(51) Int. Cl.
*G06F 3/01* (2006.01)
*G02B 27/01* (2006.01)
*H04N 5/77* (2006.01)

(52) U.S. Cl.
CPC ........... *G06F 3/013* (2013.01); *G02B 27/017* (2013.01); *G02B 2027/0138* (2013.01);
(Continued)

(58) Field of Classification Search
CPC ........... G06F 3/013; G06F 2203/04805; G02B 27/017; G02B 2027/0138; G02B 2027/014; H04N 5/772
See application file for complete search history.

(56) References Cited

U.S. PATENT DOCUMENTS 4,461,551 A 7/1984 Blaha
4,586,892 A 5/1986 Ichizawa
(Continued)

FOREIGN PATENT DOCUMENTS

CN 101990648 3/2011
CN 103110401 A 5/2013
(Continued)

OTHER PUBLICATIONS

Web Search History for U.S. Appl. No. 16/447,481, filed Sep. 10, 2020.
(Continued)

*Primary Examiner* — Zaihan Jiang
(74) *Attorney, Agent, or Firm* — Novel IP

(57) ABSTRACT

A system for the remote management of head mounted vision assist devices used by patients, is provided. The system includes head mounted vision assist devices located at various patient locations, at least one computing device used by a clinician supervising the usage of the vision assist devices by the patients, and a server communicatively coupled with each of the vision assist devices and the computing device used by the clinician. The server executes stored instructions to enable the clinician to remotely monitor the results of one or more diagnostic tests conducted by a patient at predefined time intervals and monitor a display of a head mounted vision assist device being used by the patient by mirroring the patient's display on the clinician's computing device. The server executes stored instructions that also enable the clinician to diagnose the patient based on at least one of the test results and the mirrored display and provide one or more of: prescription and therapy to treat the patient based on the diagnosis.

40 Claims, 27 Drawing Sheets

Related U.S. Application Data which is a continuation-in-part of application No. 16/447,481, filed on Jun. 20, 2019, now Pat. No. 11,144,119, which is a continuation of application No. 16/137,003, filed on Sep. 20, 2018, now Pat. No. 10,444,833, which is a continuation of application No. 14/937,373, filed on Nov. 10, 2015, now Pat. No. 10,146,304, said application No. 17/202,748 is a continuation-in-part of application No. 17/084,233, filed on Oct. 29, 2020, now Pat. No. 11,475,547, which is a continuation of application No. 16/274,976, filed on Feb. 13, 2019, now Pat. No. 10,963,999, said application No. 17/202,748 is a continuation-in-part of application No. 16/503,098, filed on Jul. 3, 2019, now Pat. No. 11,546,527.

(60) Provisional application No. 63/223,005, filed on Jul. 18, 2021, provisional application No. 63/122,840, filed on Dec. 8, 2020, provisional application No. 62/990,422, filed on Mar. 16, 2020, provisional application No. 62/155,972, filed on May 1, 2015, provisional application No. 62/131,957, filed on Mar. 12, 2015, provisional application No. 62/077,434, filed on Nov. 10, 2014, provisional application No. 62/629,774, filed on Feb. 13, 2018, provisional application No. 62/694,173, filed on Jul. 5, 2018.

(52) U.S. Cl.
CPC ............ *G02B 2027/014* (2013.01); *G06F 2203/04805* (2013.01); *H04N 5/772* (2013.01)

(56) References Cited

U.S. PATENT DOCUMENTS

| | | |
|---|---|---|
| 4,634,243 A | 1/1987 | Massof |
| 4,751,507 A | 6/1988 | Hama |
| 4,848,898 A | 7/1989 | Massof |
| 4,856,892 A | 8/1989 | Ben-Tovim |
| 5,151,722 A | 9/1992 | Massof |
| 5,359,675 A | 10/1994 | Siwoff |
| 5,717,834 A | 2/1998 | Werblin |
| 5,719,593 A | 2/1998 | De Lange |
| 5,808,589 A | 9/1998 | Fergason |
| 5,933,082 A | 8/1999 | Abita |
| 6,061,064 A | 5/2000 | Reichlen |
| 6,067,112 A | 5/2000 | Wellner |
| 6,529,331 B2 | 3/2003 | Massof |
| 6,545,685 B1 | 4/2003 | Dorbie |
| 6,590,583 B2 | 7/2003 | Soohoo |
| 6,591,008 B1 | 7/2003 | Surve |
| 6,704,034 B1 | 3/2004 | Rodriguez |
| 6,766,041 B2 | 7/2004 | Golden |
| 6,889,006 B2 | 5/2005 | Kobayashi |
| 7,486,302 B2 | 2/2009 | Shoemaker |
| 7,522,344 B1 | 4/2009 | Curatu |
| 7,542,210 B2 | 6/2009 | Chirieleison, Sr. |
| 7,612,804 B1 | 11/2009 | Marcu |
| 7,806,528 B2 | 10/2010 | Bedell |
| 7,883,210 B2 | 2/2011 | Filar |
| 8,103,352 B2 | 1/2012 | Fried |
| 8,239,031 B2 | 8/2012 | Fried |
| 8,253,787 B2 | 8/2012 | Yamamoto |
| 8,311,328 B2 | 11/2012 | Spruck |
| 8,350,898 B2 | 1/2013 | Chang |
| 8,454,166 B2 | 6/2013 | Fateh |
| 8,490,194 B2 | 7/2013 | Moskovitch |
| 8,511,820 B2 | 8/2013 | Trachtman |
| 8,516,584 B2 | 8/2013 | Moskovitch |
| 8,571,670 B2 | 10/2013 | Fried |
| 8,725,210 B2 | 5/2014 | Yang |
| 8,760,569 B2 | 6/2014 | Yang |
| 8,798,453 B2 | 8/2014 | Lawton |
| 8,836,778 B2 | 9/2014 | Ignatovich |
| 8,862,183 B2 | 10/2014 | Kulas |
| D717,856 S | 11/2014 | Slawson |
| 8,879,813 B1 | 11/2014 | Solanki |
| 8,888,288 B2 | 11/2014 | Iravani |
| 8,905,543 B2 | 12/2014 | Davis |
| 8,922,366 B1 | 12/2014 | Honoré |
| 8,976,247 B1 | 3/2015 | Karner |
| 9,019,420 B2 | 4/2015 | Hurst |
| 9,031,610 B2 | 5/2015 | Kulas |
| 9,066,683 B2 | 6/2015 | Zhou |
| 9,149,179 B2 | 10/2015 | Barnard |
| 9,213,185 B1 | 12/2015 | Starner |
| 9,215,977 B2 | 12/2015 | Kohn |
| 9,545,422 B2 | 1/2017 | Greenberg |
| 9,607,652 B2 | 3/2017 | Bose |
| 9,706,918 B2 | 7/2017 | Myung |
| 9,891,435 B2 | 2/2018 | Boger |
| 10,092,182 B2 | 10/2018 | Myung |
| 10,146,304 B2 | 12/2018 | Werblin |
| 10,188,294 B2 | 1/2019 | Myung |
| D848,420 S | 5/2019 | Boger |
| 10,345,591 B2 | 7/2019 | Samec |
| D863,300 S | 10/2019 | Boger |
| 10,444,833 B2 | 10/2019 | Werblin |
| 10,488,659 B2 | 11/2019 | Boger |
| 10,613,323 B1 | 4/2020 | Wheelwright |
| 10,743,761 B2 | 8/2020 | Myung |
| 11,144,119 B2 | 10/2021 | Werblin |
| 2002/0101568 A1 | 8/2002 | Eberl |
| 2002/0181115 A1 | 12/2002 | Massof |
| 2003/0117580 A1* | 6/2003 | Franz .............. G16H 50/20 |
| | | 351/205 |
| 2003/0182394 A1 | 9/2003 | Ryngler |
| 2004/0136570 A1 | 7/2004 | Ullman |
| 2004/0208343 A1 | 10/2004 | Golden |
| 2005/0162512 A1 | 7/2005 | Seakins |
| 2005/0200707 A1 | 9/2005 | Yogesan |
| 2005/0237485 A1 | 10/2005 | Blum |
| 2005/0270484 A1 | 12/2005 | Maeda |
| 2006/0129207 A1 | 6/2006 | Fried |
| 2006/0167530 A1* | 7/2006 | Flaherty .............. G06F 3/015 |
| | | 607/62 |
| 2006/0282129 A1 | 12/2006 | Fried |
| 2006/0290712 A1 | 12/2006 | Hong |
| 2007/0106143 A1* | 5/2007 | Flaherty .............. A61N 1/0531 |
| | | 607/116 |
| 2007/0198941 A1 | 8/2007 | Baar |
| 2007/0235648 A1 | 10/2007 | Teich |
| 2007/0280677 A1 | 12/2007 | Drake |
| 2007/0294768 A1 | 12/2007 | Moskovitch |
| 2008/0106489 A1 | 5/2008 | Brown |
| 2008/0184371 A1 | 7/2008 | Moskovitch |
| 2008/0238947 A1 | 10/2008 | Keahey |
| 2008/0247620 A1 | 10/2008 | Lewis |
| 2008/0278821 A1 | 11/2008 | Rieger |
| 2009/0059364 A1 | 3/2009 | Brown |
| 2009/0062686 A1 | 3/2009 | Hyde |
| 2009/0214485 A1 | 8/2009 | Gavrilova |
| 2009/0322859 A1* | 12/2009 | Shelton .............. H04N 13/207 |
| | | 348/46 |
| 2010/0016730 A1* | 1/2010 | Tanaka .............. A61B 3/024 |
| | | 600/476 |
| 2010/0079356 A1 | 4/2010 | Hoellwarth |
| 2010/0283800 A1 | 11/2010 | Cragun |
| 2010/0289632 A1 | 11/2010 | Seder |
| 2010/0328420 A1 | 12/2010 | Roman |
| 2011/0085138 A1 | 4/2011 | Filar |
| 2011/0102579 A1 | 5/2011 | Sung |
| 2011/0214082 A1 | 9/2011 | Osterhout |
| 2011/0221656 A1* | 9/2011 | Haddick .............. H04N 5/44 |
| | | 345/156 |
| 2011/0224145 A1 | 9/2011 | Greenberg |
| 2011/0241976 A1 | 10/2011 | Boger |
| 2011/0299036 A1 | 12/2011 | Goldenholz |
| 2012/0062840 A1 | 3/2012 | Ballou, Jr. |
| 2012/0127128 A1 | 5/2012 | Large |
| 2012/0176689 A1 | 7/2012 | Brown |

(56) References Cited

U.S. PATENT DOCUMENTS

| | | | |
|---|---|---|---|
| 2012/0194550 A1 | 8/2012 | Osterhout | |
| 2012/0212594 A1* | 8/2012 | Barnes | G09B 21/008 |
| | | | 348/E7.085 |
| 2012/0229617 A1 | 9/2012 | Yates | |
| 2012/0242678 A1 | 9/2012 | Border | |
| 2012/0249797 A1* | 10/2012 | Haddick | G04G 21/04 |
| | | | 701/491 |
| 2012/0262558 A1 | 10/2012 | Boger | |
| 2012/0277826 A1 | 11/2012 | Fried | |
| 2012/0316776 A1 | 12/2012 | Brown | |
| 2012/0320340 A1 | 12/2012 | Coleman, III | |
| 2013/0050273 A1 | 2/2013 | Fujimura | |
| 2013/0083185 A1 | 4/2013 | Coleman, III | |
| 2013/0110236 A1 | 5/2013 | Nirenberg | |
| 2013/0127980 A1 | 5/2013 | Haddick | |
| 2013/0128364 A1 | 5/2013 | Wheeler | |
| 2013/0150123 A1 | 6/2013 | Kulas | |
| 2013/0242262 A1 | 9/2013 | Lewis | |
| 2013/0293840 A1 | 11/2013 | Bartels | |
| 2013/0300919 A1 | 11/2013 | Fletcher | |
| 2013/0329190 A1 | 12/2013 | Lewis | |
| 2014/0002792 A1 | 1/2014 | Filar | |
| 2014/0071547 A1 | 3/2014 | O'Neill | |
| 2014/0078594 A1 | 3/2014 | Springer | |
| 2014/0085603 A1 | 3/2014 | Su | |
| 2014/0098120 A1 | 4/2014 | Ritts | |
| 2014/0114208 A1 | 4/2014 | Smith | |
| 2014/0132932 A1 | 5/2014 | Jung | |
| 2014/0192022 A1* | 7/2014 | Yamamoto | G06F 3/0488 |
| | | | 345/174 |
| 2014/0192316 A1 | 7/2014 | Krenik | |
| 2014/0218193 A1 | 8/2014 | Huston | |
| 2014/0228668 A1 | 8/2014 | Wakizaka | |
| 2014/0268053 A1 | 9/2014 | Fabian | |
| 2014/0327753 A1 | 11/2014 | Prabhakar | |
| 2014/0327754 A1 | 11/2014 | Prabhakar | |
| 2014/0327755 A1 | 11/2014 | Prabhakar | |
| 2014/0350379 A1 | 11/2014 | Verdooner | |
| 2015/0002950 A1 | 1/2015 | O'Neill | |
| 2015/0042873 A1 | 2/2015 | Hunt | |
| 2015/0045012 A1 | 2/2015 | Siminou | |
| 2015/0077565 A1 | 3/2015 | Karner | |
| 2015/0098060 A1 | 4/2015 | Zhou | |
| 2015/0103317 A1* | 4/2015 | Goldfain | A61B 3/10 |
| | | | 351/207 |
| 2015/0104087 A1 | 4/2015 | Katuwal | |
| 2015/0138048 A1 | 5/2015 | Park | |
| 2015/0169531 A1 | 6/2015 | Campbell | |
| 2015/0223678 A1 | 8/2015 | Goldfain | |
| 2015/0223686 A1 | 8/2015 | Wang | |
| 2015/0234189 A1* | 8/2015 | Lyons | G02B 27/017 |
| | | | 345/174 |
| 2015/0235426 A1 | 8/2015 | Lyons | |
| 2015/0254524 A1 | 9/2015 | Dickrell, III | |
| 2015/0257639 A1 | 9/2015 | Manquez Hatta | |
| 2015/0313462 A1 | 11/2015 | Reis | |
| 2015/0320313 A1 | 11/2015 | Stamile | |
| 2015/0339589 A1 | 11/2015 | Fisher | |
| 2015/0346348 A1 | 12/2015 | Liu | |
| 2015/0348327 A1* | 12/2015 | Zalewski | G06F 3/01 |
| | | | 345/419 |
| 2016/0015264 A1 | 1/2016 | Pankajakshan | |
| 2016/0045388 A1 | 2/2016 | Krenik | |
| 2016/0048203 A1 | 2/2016 | Blum | |
| 2016/0051142 A1 | 2/2016 | Howes | |
| 2016/0063893 A1* | 3/2016 | Kanuganti | H04N 21/8545 |
| | | | 348/62 |
| 2016/0097930 A1 | 4/2016 | Robbins | |
| 2016/0104453 A1 | 4/2016 | Borenstein | |
| 2016/0113489 A1 | 4/2016 | Myung | |
| 2016/0156850 A1 | 6/2016 | Werblin | |
| 2016/0173752 A1 | 6/2016 | Caviedes | |
| 2016/0199649 A1 | 7/2016 | Barnes | |
| 2016/0264051 A1 | 9/2016 | Werblin | |
| 2016/0314564 A1 | 10/2016 | Jones | |
| 2016/0379593 A1 | 12/2016 | Borenstein | |
| 2017/0172675 A1 | 6/2017 | Jarc | |
| 2017/0200296 A1 | 7/2017 | Jones | |
| 2017/0236332 A1 | 8/2017 | Kipman | |
| 2017/0280996 A1 | 10/2017 | Myung | |
| 2018/0017820 A1 | 1/2018 | Cheng | |
| 2018/0116509 A1 | 5/2018 | Myung | |
| 2018/0125716 A1 | 5/2018 | Cho | |
| 2018/0144554 A1 | 5/2018 | Watola | |
| 2018/0239137 A1 | 8/2018 | Boger | |
| 2018/0239425 A1 | 8/2018 | Jang | |
| 2018/0330169 A1 | 11/2018 | Van Hoof | |
| 2019/0026958 A1 | 1/2019 | Gausebeck | |
| 2019/0056783 A1 | 2/2019 | Werblin | |
| 2019/0094552 A1 | 3/2019 | Shousha | |
| 2019/0142270 A1 | 5/2019 | Monhart | |
| 2019/0180421 A1 | 6/2019 | Kim | |
| 2019/0208186 A1 | 7/2019 | Kawabe | |
| 2019/0222817 A1 | 7/2019 | Abou Shousha | |
| 2019/0227327 A1 | 7/2019 | Abou Shousha | |
| 2019/0251672 A1 | 8/2019 | Lim | |
| 2019/0251679 A1 | 8/2019 | Werblin | |
| 2019/0302886 A1 | 10/2019 | Werblin | |
| 2020/0008673 A1 | 1/2020 | Myung | |
| 2020/0097019 A1 | 3/2020 | Yu | |
| 2020/0112691 A1 | 4/2020 | Werblin | |
| 2020/0151859 A1 | 5/2020 | Long, II | |
| 2020/0311887 A1 | 10/2020 | Kar | |
| 2021/0153741 A1* | 5/2021 | Berdahl | A61B 5/4836 |
| 2021/0271318 A1 | 9/2021 | Bradley | |
| 2021/0290056 A1 | 9/2021 | Karandikar | |
| 2021/0373656 A1 | 12/2021 | Watola | |
| 2022/0007929 A1 | 1/2022 | Padula | |
| 2022/0043513 A1 | 2/2022 | Werblin | |
| 2022/0094854 A1 | 3/2022 | Gong | |
| 2022/0171456 A1 | 6/2022 | Siddiqi | |
| 2022/0256133 A1 | 8/2022 | Routhier | |
| 2022/0392628 A1* | 12/2022 | Grajales | H04L 67/12 |

FOREIGN PATENT DOCUMENTS

| | | | |
|---|---|---|---|
| CN | 104688179 A | 6/2015 | |
| CN | 113019973 A | 6/2021 | |
| EP | 2621169 A1 | 7/2013 | |
| JP | 2004279733 A | 10/2004 | |
| JP | 2005524462 A | 8/2005 | |
| JP | 2006212102 A | 8/2006 | |
| JP | 2007178409 | 7/2007 | |
| JP | 2007520243 | 7/2007 | |
| JP | 2008093118 A | 4/2008 | |
| JP | 2008295725 A | 12/2008 | |
| JP | 2009031685 | 2/2009 | |
| JP | 2013104986 A | 5/2013 | |
| JP | 2013125038 | 6/2013 | |
| WO | 1992008157 A1 | 5/1992 | |
| WO | 1995006288 A2 | 3/1995 | |
| WO | 1998044468 A1 | 10/1998 | |
| WO | 2002086590 A1 | 10/2002 | |
| WO | 2002099597 A2 | 12/2002 | |
| WO | 03043363 A1 | 5/2003 | |
| WO | 2007069294 A1 | 6/2007 | |
| WO | 2008055262 A2 | 5/2008 | |
| WO | 2011097577 | 8/2011 | |
| WO | 2011159757 A2 | 12/2011 | |
| WO | 2012142202 A1 | 10/2012 | |
| WO | 2012176960 A1 | 12/2012 | |
| WO | WO-2013155002 A1 * | 10/2013 | G06Q 10/10 |
| WO | 2014015378 A1 | 1/2014 | |
| WO | 2014181096 A1 | 11/2014 | |
| WO | 2014194182 A1 | 12/2014 | |
| WO | 2015035229 A2 | 3/2015 | |
| WO | 2015054672 A1 | 4/2015 | |
| WO | 2015071779 A1 | 5/2015 | |
| WO | 2016077343 A1 | 5/2016 | |
| WO | 2016144419 A1 | 9/2016 | |
| WO | 2016205709 A1 | 12/2016 | |
| WO | 2017149526 A2 | 9/2017 | |

(56) References Cited

FOREIGN PATENT DOCUMENTS

| WO | 2018053509 A1 | 3/2018 |
|---|---|---|
| WO | 2019094047 A1 | 5/2019 |
| WO | 2019160962 A1 | 8/2019 |

OTHER PUBLICATIONS

Chen-Yung Hsu and Mark M. Uslan; When Is a Little Magnification Enough? A Review of Microsoft Magnifier, AccessWorld Magazine, Jul. 2000, vol. 1, No. 4.
Richard D. Juday and David S. Loshin; Some Examples of Image Warping for Low Vision Prosthesis; Speidigitallibrary.org, Aug. 22, 1988.
Google Search of How to Install and Use Microsoft Magnifier, Mar. 29, 2018.
Gergely Vass and Tama Perlaki; Applying and removing lens distortion in post production, Colorfront Ltd., Budapest, 2003.
Eric Kenneth Victorson; A Head Mounted Digital Image Warping Prosthesis for Age-Related Macular Degeneration; U of Minn., May 2014.
International Search Report for PCT/US20/40726, dated Sep. 14, 2020.
Written Opinion of the International Searching Authority for PCT/US20/40726, dated Sep. 14, 2020.
International Search Report for PCT/US15/59950, dated Apr. 11, 2016.
Written Opinion of the International Searching Authority for PCT/US15/59950, dated Apr. 11, 2016.
International Search Report for PCT/US16/12135, dated Apr. 29, 2016.
Written Opinion of the International Searching Authority for PCT/US16/12135, dated Apr. 29, 2016.
International Search Report for PCT/US19/17860, dated May 14, 2019.
Written Opinion of the International Searching Authority for PCT/US19/17860, dated May 14, 2019.
International Search Report for PCT/US21/22491, dated Aug. 12, 2021.
Written Opinion of the International Searching Authority for PCT/US21/22491, dated Aug. 12, 2021.
Stelmack, et al. "Is there a standard of care for eccentric viewing training?" Journal of Rehabilitation Research & Development; vol. 41, No. 5, pp. 729-738; Sep./Oct. 2004.
Hassan, et al. "Changes in the Properties of the Preferred Retinal Locus with Eccentric Viewing Training", Optom Vis Sci 2019;96:79-86. doi: 10.1097/OPX.0000000000001324.
International Search Report for PCT/US16/38176, dated Sep. 7, 2016.
Github; RNCryptor/RNCryptor; 7 pages; retrieved from the internet (https://github.com/RNCryptor/RNCryptor).
Haddock et al.; Simple, inexpensive technique for high-quality smartphone fundus photography in human and animal eyes; Journal of Opththalmology; 2013; pp. 1-5; published online Sep. 19, 2013.
Hester et al.; Smart Phoneography—how to take slit lamp photographs with an iphone; 12 pages; retrieved from internet (http://eyewiki.aao.org/Smart_Phoneography_-_How_to_take_slit_lamp_photographs_with_an_iPhone).
Kim et al.; Smartphone photography safety; Ophthalmology; 119(10); pp. 220-2201; Oct. 2012.
Lord et al.; Novel uses of smartphones in ophthalmology; Ophthalmology; 117(6); pp. 1274-1274 e3; Jun. 2010.
Teichman et al.; From iphone to eyephone: a technique for photodocumentation; Can. J. Ophthalmol.; 46(3); pp. 284-286; Jun. 2011.
Wikipedia: Soap note; 6 pages; retreived from the interet (http://en.wikipedia.org/wiki/SOAP_note).
Apple Developer; Apple app store connect user guide; 4 pages; retrieved from the internet (https://developer.apple.com/support/appstore-connect/).
Bastawrous; Smartphone fundoscopy; Ophthalmology; 119(2); pp. 432-433. e2; Feb. 2012.
Chakrabarti; Application of mobile technology in ophthalmology to meet the demands of low-resource settings; Journal of Mobile Technology in Medicine; 1(4S); pp. 1-3; Dec. 2012.
Chhablani et al.; Smartphones in ophthalmology; Indian J. Ophthalmol.; 60(2); pp. 127-131; Mar./Apr. 2012 (Author Manuscript).
Echanique et al.; Ocular Cellscope; University of California at Berkeley; Electrical engineering and computer sciences; 23 pages; retrieved from the internet (http://digitalassets.lib.berkeley.edu/techreports/ucb/text/EECS-2014-91.pdf); May 16, 2014.
Github; Nicklockwood/iCarousel; A simple, highly customisable, data-driven 3D carousel for iOS and Mac OS; 30 pages; retrieved from teh internet (https://github.com/nicklockwood/iCarousel).
Github; Project-imas / encrypted-core-data; 6 pages; retrieved from the internet (https://github.com/project-imas/encrypted-core-data);.
Sample et al.; "Imaging and Perimtery Society Standards and Guidelines" Optometry and Vision Science, vol. 88, No. 1, Jan. 2011, pp. 4-7.
Lawton Teri A. et al: "Image enhancement improves reading performance in age-related macular degeneration patients", Vision Research, vol. 38, No. 1, Jan. 1, 1998 (Jan. 1, 1998), pp. 153-162, XP055884282, Amsterdam, NL, ISSN: 0042-6989, DOI: 10.1016/S0042-6989(97)00140-5.
Birkfellner, W. "Computer-enhanced stereoscopic vision in a head-mounted operating binocular" Physics in Medicine & Biology, vol. 48, No. 3, Jan. 22, 2003.
Victorson, E. "A Head Mounted Digital Image Warping Prosthesis for Age-Related Macular Degeneration" Univ. of Minnesota, May 2014, pp. 1-170.
Smythies, John; "A note on the concept of the visual field in neurology, psychology, and visual neuroscience", Perception, 1996, vol. 25, pp. 369-371.
Ho, translation of CN 101990648, Oct. 2008 (Year: 2008).
International Search Report for PCT/US21/72593, dated Mar. 25, 3022.
International Search Report for PCT/US21/72815, dated Apr. 4, 2022.

\* cited by examiner

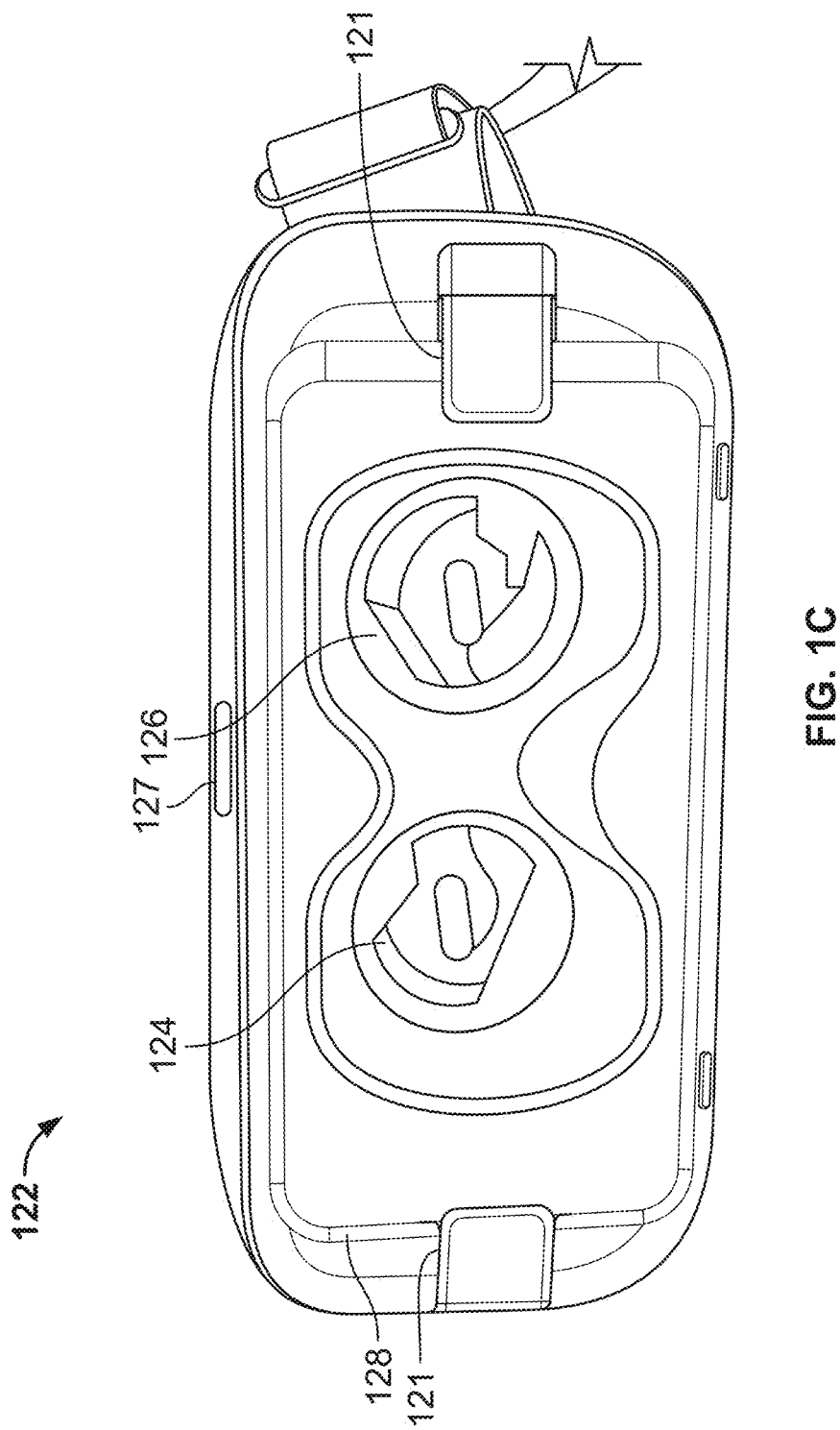

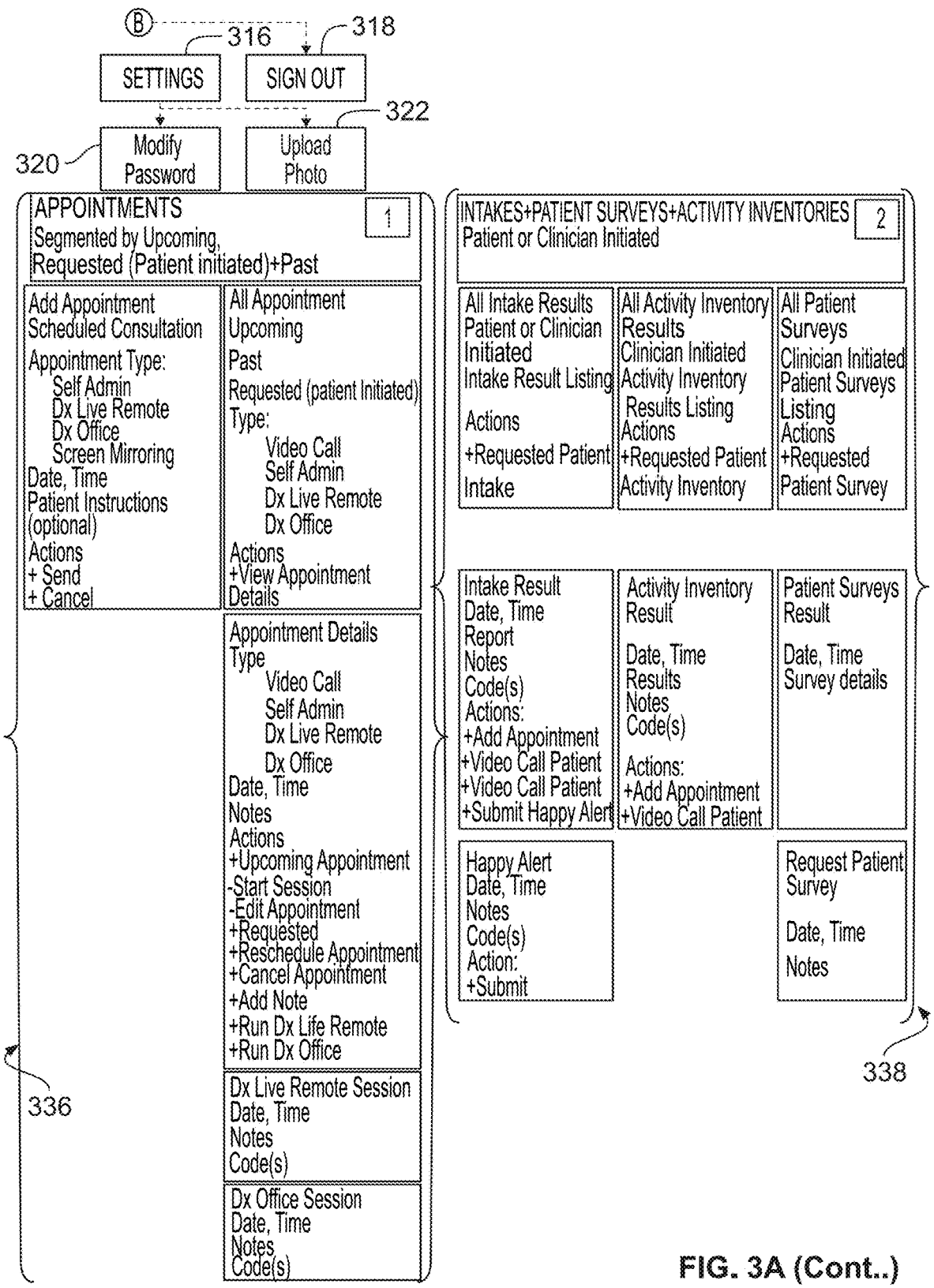
FIG. 3A (Cont..)

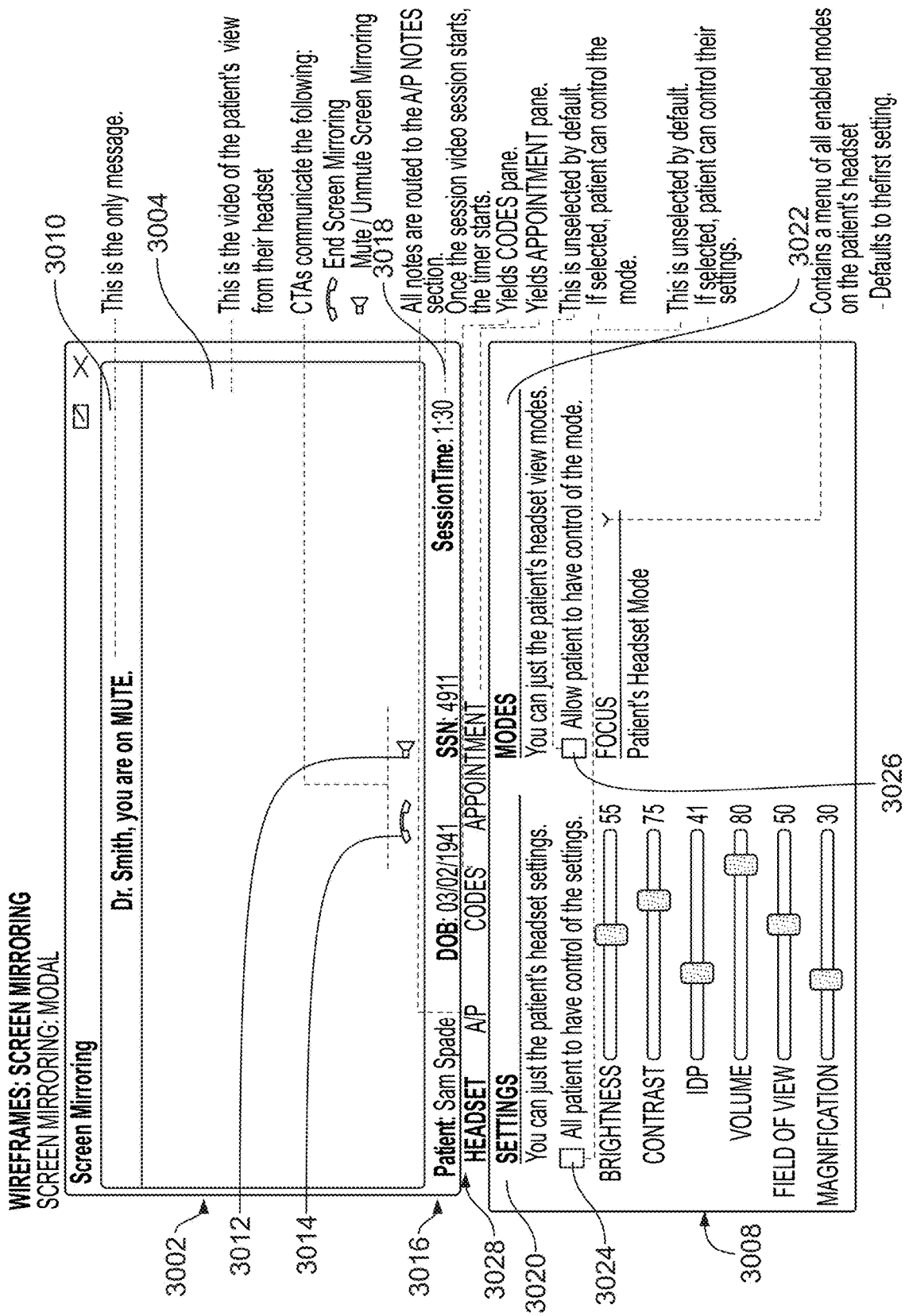

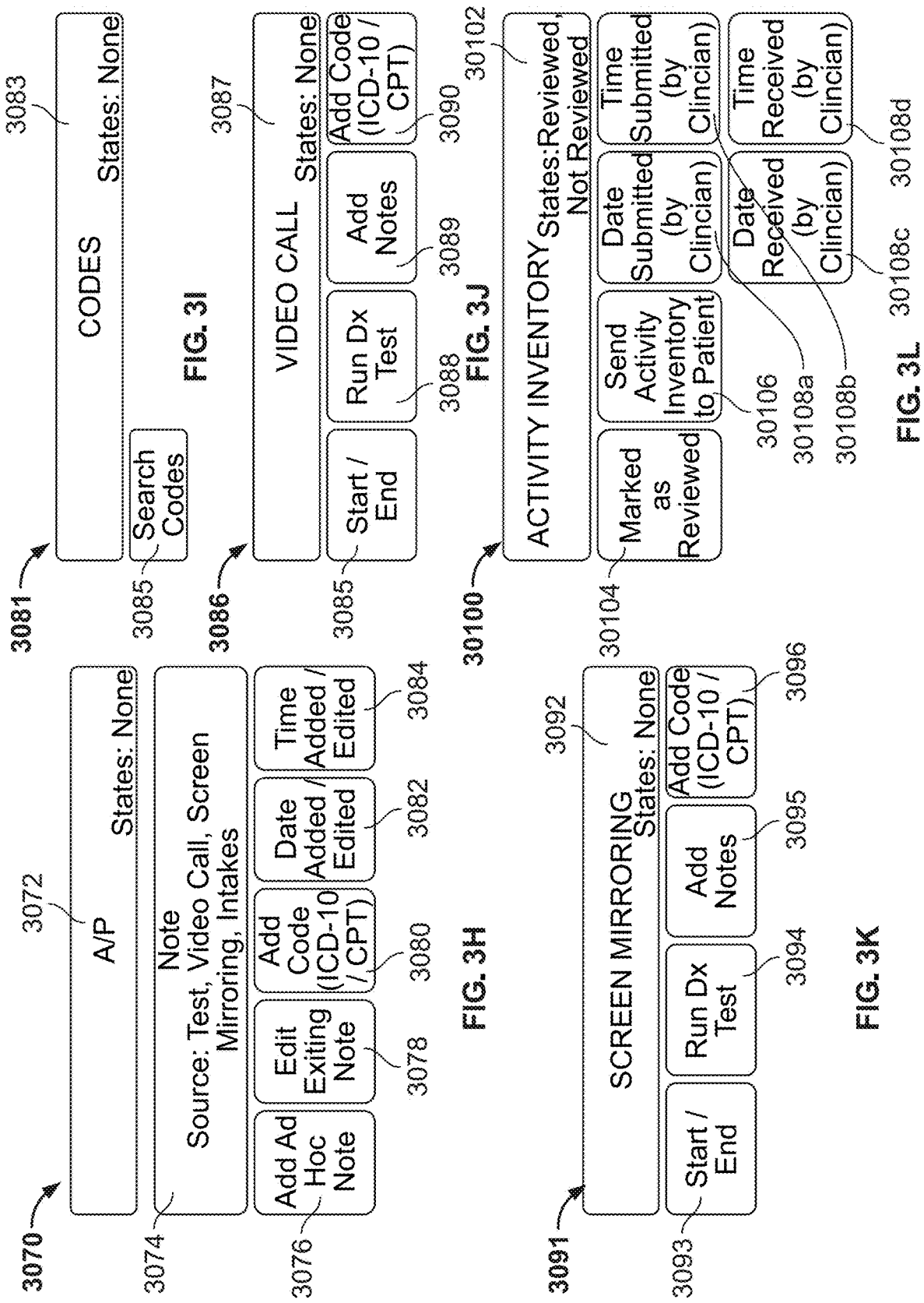

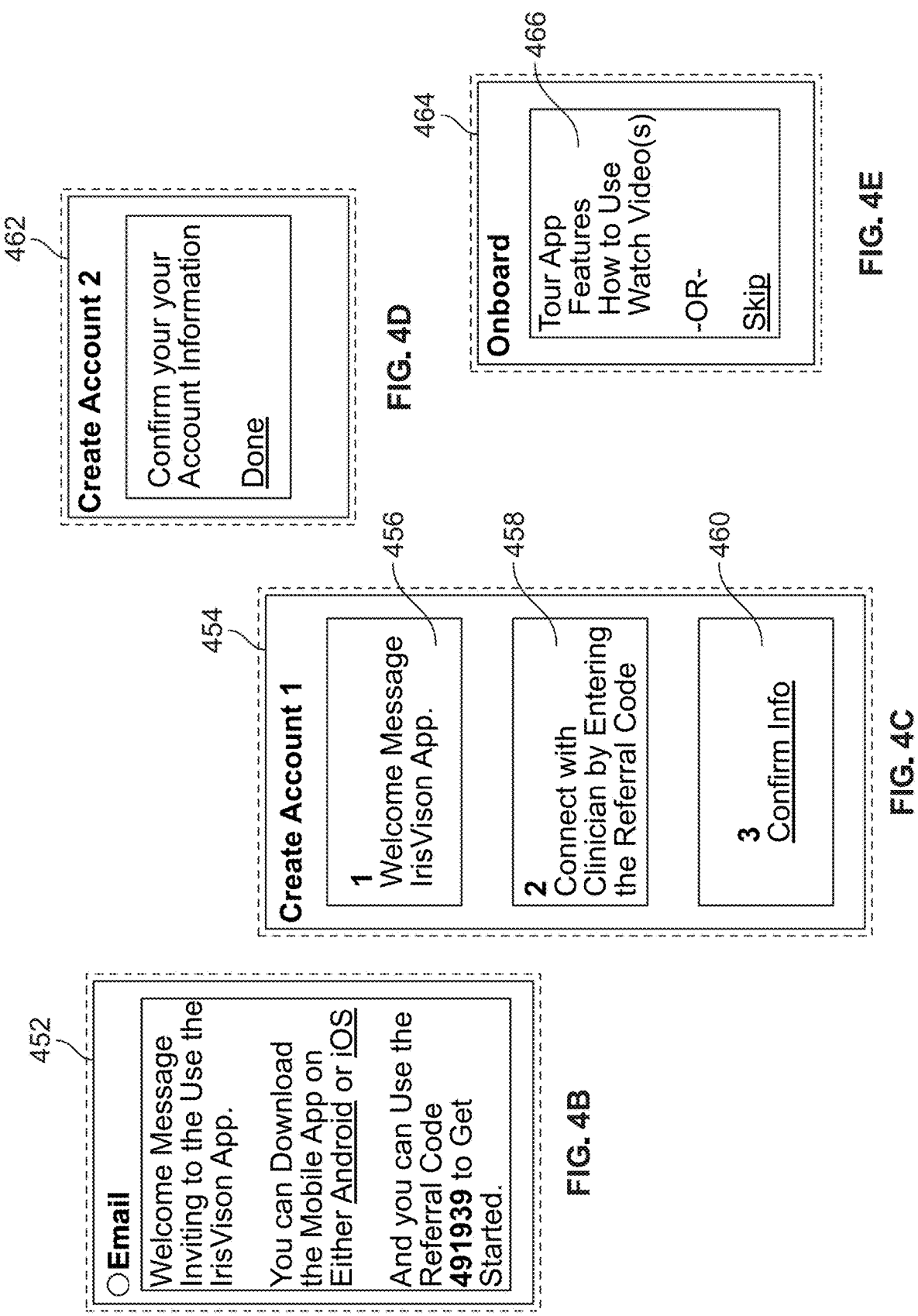

Patient Survey

To help your clinician provide you with the best care, please complete the following survey.

START

CANCEL

Patient Survey

Question 5 of 7:

If you used one or more of IrisVision's Digital Vision Clinic's vision tests, how easy was it to perform the vision test without assistance?

○ N/A
○ 5 - Extremely Easy
○ 4 - Easy
○ 3 - Neutral
○ 2 - Not Easy
○ 1 - Extremely Not Easy

NEXT

CANCEL

Patient Survey

Question 1 of 7:

How likely would you recommend IrisVision's Digital Vision Clinic to a friend or family member?

○ 10-Extremely Likely
○ 9
○ 8
○ 7
○ 6
○ 5
○ 4
○ 3
○ 2
○ 1

NEXT

CANCEL

Patient Survey

Question 2 of 7:

In the past month, how many times have you used IrisVision's Digital Vision Clinic app?

- ● 5 or more
- ○ 4
- ○ 3
- ○ 2
- ○ 1

[NEXT]
[CANCEL]

Patient Survey

Question 3 of 7:

Was your primary purpose adequately addressed using IrisVision's Digital Vision Clinical appointment?

- ○ 5 - Strongly Agree
- ○ 4 - Agree
- ○ 3 - Neutral
- ○ 2 - Disagree
- ○ 1 - Strongly Disagree

[NEXT]
[CANCEL]

Patient Survey

Question 6 of 7:

How satisfied were you using IrisVision's Digital Vision Clinic's ease of use?

- ○ 5 - Strongly Satisfied
- ○ 4 - Satisfied
- ○ 3 - Neutral
- ○ 2 - Not Satisfied
- ○ 1 - Strongly Not Satisfied

[NEXT]
[CANCEL]

Patient Survey

Question 7 of 7:

Please provide any additional information regarding your eye remote appointment, the technology, or any recommendations for improvement:

Please describe.

[NEXT]
[CANCEL]

FIG. 7 (Cont.)

METHOD AND SYSTEM FOR REMOTE CLINICIAN MANAGEMENT OF HEAD-MOUNTED VISION ASSIST DEVICES

CROSS-REFERENCE

The present application relies on U.S. Patent Provisional Application No. 63/122,840, titled "Method and System for Remote Management of Head-Mounted Vision Assist Devices" and filed on Dec. 8, 2020, for priority.

The present application also relies on U.S. Patent Provisional Application No. 63/223,005, titled "Methods and Systems for Determining a Variety of Vision Parameters in a Head-Mounted Vision Device" and filed on Jul. 18, 2021, for priority.

The present application is also a continuation-in-part application of U.S. patent application Ser. No. 17/202,748, titled "Multi-Modal Vision Enhancement System" and filed on Mar. 16, 2021, which relies on, for priority, U.S. Patent Provisional Application No. 62/990,422, titled "Multi-Modal Vision Enhancement System" and filed on Mar. 16, 2020, which is herein incorporated by reference in its entirety.

U.S. patent application Ser. No. 17/202,748 is also a continuation-in-part application of U.S. patent application Ser. No. 16/447,481, titled "Methods and Apparatus for Vision Enhancement", filed on Jun. 20, 2019 and issued as U.S. Pat. No. 11,144,119 on Oct. 12, 2021, which is a continuation application of U.S. patent application Ser. No. 16/137,003, of the same title, filed on Sep. 20, 2018, and issued as U.S. Pat. No. 10,444,833 on Oct. 15, 2019, which is a continuation application of U.S. patent application Ser. No. 14/937,373, of the same title, filed on Nov. 10, 2015, and issued as U.S. Pat. No. 10,146,304 on Dec. 4, 2018, which, in turn, relies on the following for priority: U.S. Patent Provisional Application No. 62/077,434, titled "Low Vision Head-Mounted Visual Enhancement Device" and filed on Nov. 10, 2014; U.S. Patent Provisional Application No. 62/131,957, titled "Eye Tracking Systems" and filed on Mar. 12, 2015; and U.S. Patent Provisional Application No. 62/155,972, titled "Universal Testbed and Platform to Improve the Performance of Low Vision Patients" and filed on May 1, 2015. All of the above-mentioned applications are herein incorporated by reference in their entirety.

U.S. patent application Ser. No. 17/202,748 is also a continuation-in-part application of U.S. patent application Ser. No. 17/084,233, titled "Methods and Apparatus for Contrast Sensitivity Compensation" and filed on Oct. 29, 2020, which is a continuation application of U.S. patent application Ser. No. 16/274,976, of the same title, filed on Feb. 13, 2019, and issued as U.S. Pat. No. 10,963,999 on Mar. 30, 2021, which, in turn, relies on U.S. Patent Provisional Application No. 62/629,774, titled "Methods and Apparatus for Low Vision Enhancement" and filed on Feb. 13, 2018, for priority. All of the above-mentioned applications are herein incorporated by reference in their entirety.

U.S. patent application Ser. No. 17/202,748 is also a continuation-in-part application of U.S. patent application Ser. No. 16/503,098, titled "Methods and Apparatuses for Compensating for Retinitis Pigmentosa" and filed on Jul. 3, 2019, which, in turn, relies on U.S. Patent Provisional Application No. 62/694,173, titled "Compensating for Retinitis Pigmentosa: Using dynamic shifts in field of view and magnification" and filed on Jul. 5, 2018, for priority.

The above-mentioned applications are herein incorporated by reference in their entirety.

FIELD

The present specification relates to vision-enhancement systems and methods. Specifically, the embodiments disclosed herein are directed toward enabling a clinician to remotely interface with a patient via a head-mounted vision assist device and/or manage the use of head-mounted vision assist devices by a plurality of patients.

BACKGROUND

Head-mounted vision assist and diagnostic devices (HMVADD) enable individuals who suffer from a variety of vision conditions to see better and provide increased access to ophthalmological evaluations or diagnoses for individuals who do not have access to, or are remote from, a clinician. For example, a HMVADD may provide one or more image or data processing features which transform captured images such that an individual with retinitis pigmentosa, strabismus, scotoma, decreased contrast sensitivity or poor visual acuity can better see normally.

HMVADDs, which may be prescribed by a clinician, may often have numerous features, diagnostic capabilities, and/or vision settings, which need to be actively managed for an individual patient's vision to be properly assessed or to ensure the individual patient, can properly see using the HMVADD. More specifically, a HMVADD may be prescribed by an ophthalmologist to a patient requiring vision assistance the HMVADD may need to be initiated, configured, and regularly monitored to detect vision problems, diagnose vision-related conditions, and/or direct a patient through vision therapies. Without such clinician assistance, there is a substantial risk that an individual patient's vision condition will be improperly assessed and/or the individual will receive inadequate therapy.

Hence, there is need for vision assist systems and methods through which clinicians may effectively interact with, obtain data from, and control each head-mounted vision device being used by a patient. There is also a need for a HMVADD platform that can enable a clinician to guide, direct, or otherwise manage an individual patient's use of the HMVADD in order to better tailor such use to the specific visual state of the individual patient. There is need for a HMVADD platform that can be used for conducting vision tests on patients and that can store, aggregate, and correlate the test results. Finally, there is a need for a HMVADD platform that can effectively integrate individual HMVADDs, clinician legacy systems, and graphical user interfaces through which a clinician can interact with each individual HMVADD.

SUMMARY

The following embodiments and aspects thereof are described and illustrated in conjunction with systems, tools and methods, which are meant to be exemplary and illustrative, not limiting in scope. The present application discloses numerous embodiments.

The present specification discloses a system for remote management of head mounted vision assist devices being used by patients, the system comprising: a plurality of head mounted vision assist devices located at a plurality of patient locations; at least one computing device being used by a clinician who is supervising the patients' usage of each of the plurality of head mounted vision assist devices, wherein the at least one computing device is located remote to the plurality of patient locations; a server computer at least periodically communicatively coupled with each of the plurality of vision assist devices and the at least one computing device, wherein the server computer comprises a processor and is coupled with a non-transient memory comprising programmatic instructions and wherein, when executed by the processor, the programmatic instructions: cause results of one or more diagnostic tests conducted by the patients at the plurality of patient locations using the plurality of head mounted vision assist devices to be transmitted to the at least one computing device; mirror displays associated with the plurality of plurality of head mounted vision assist devices on the at least one computing device to enable the clinician to monitor each of the patients' field of view; receive a diagnosis of each of the patients, from the clinician, based on at least one of the results from the one or more diagnostic tests or the mirrored display of the field of view; and receive at least one of a prescription or an instruction to perform a therapy in order to treat the patient based on the diagnosis.

Optionally, the clinician's computing device is located remote to the location of the server computer and at least some of the plurality of patient locations are located remote from each other.

Optionally, the processor is further programmed to execute the programmatic instructions to enable the patients and the clinician to remotely schedule consultation appointments, modify scheduled appointments, and/or cancel scheduled appointments.

Optionally, the processor is further programmed to execute the programmatic instructions to enable the clinician to remotely initiate and conduct a video call to a patient.

Optionally, when executed by the processor, the programmatic instructions mirror patients' displays on the clinician's at least one computing device by causing a display of one or more predefined variables corresponding to the patients' medical condition. Optionally, when executed by the processor, the programmatic instructions receive modifications to the displayed one or more predefined variables from the clinician and cause corresponding modifications to the one or more predefined variables in one or more of the plurality of head mounted vision assist devices in real time. Optionally, the corresponding modifications to the one or more predefined variables in one or more of the plurality of head mounted vision assist devices are experienced by one or more of the patients in real-time and are mirrored to the at least one computer in real time in order to be seen by the clinician.

Optionally, when executed by the processor, the programmatic instructions automatically adjust at least one of a type of a diagnostic test or a frequency of a diagnostic test presented to patients based upon results of the one or more diagnostic tests.

Optionally, when executed by the processor, the programmatic instructions generate notifications and cause the notifications to be transmitted to the clinician based upon results of the one or more diagnostic tests indicating vision changes in the patients.

Optionally, at least one of the diagnostic tests comprises an environmental test to determine light exposure in the patients' surroundings.

Optionally, when executed by the processor, the programmatic instructions cause said results of one or more diagnostic tests conducted by the patients at the plurality of patient locations using the plurality of head mounted vision assist devices to be automatically transmitted to the at least one computing device at predefined intervals.

Optionally, when executed by the processor, the programmatic instructions mirror displays associated with the plurality of plurality of head mounted vision assist devices on the at least one computing device to enable the clinician to monitor each of the patients' field of view in real-time.

Optionally, when executed by the processor, the programmatic instructions mirror displays associated with the plurality of head mounted vision assist devices on the at least one computing device to enable the clinician to monitor what the patients experienced in their fields of view at some earlier point in time.

The present specification also discloses a method for remote management of head mounted vision assist devices being used by patients, wherein a plurality of head mounted vision assist devices being located at a plurality of patient locations are coupled with at least one computing device being used by a clinician via a server computer communicatively coupled with each of the plurality of vision assist devices and the at least one computing device, the method comprising the clinician via the computing device: monitoring results of one or more diagnostic tests conducted by a patient at predefined time intervals; monitoring a display of a head mounted vision assist device being used by the patient by mirroring the patient's display on the computing device; diagnosing the patient based on at least one of: the test results and the mirrored display; and providing one or more of: prescription and therapy to treat the patient based on the diagnosis.

Optionally, the clinician's computing device is located remote to the plurality of patient locations and a location of the server computer.

Optionally, the method of comprises setting by the clinician consultation appointments; modifying the appointments; and canceling the appointments, remotely.

Optionally, the method of further comprises the clinician remotely making a video call to a patient for diagnosing the patient.

Optionally, mirroring the patient's display on the clinician's computing device comprises displaying one or more predefined variables corresponding to the patient's medical condition for evaluation by the clinician. Optionally, changes made to the displayed variables by the clinician cause corresponding changes to be made in real time in the display of the patient's vision assist device. Optionally, the changes in the display of the patient's vision assist device made in real time are seen by the clinician via the mirroring of the patient's display, and the clinician diagnoses the patient based on said changes.

Optionally the method further comprises automatically adjusting at least one of: a type or frequency of a diagnostic test conducted by the patient if a result of the one or more diagnostic tests conducted by the patient indicates a condition change in the patient.

The present specification also discloses a method for managing a plurality of head mounted vision assist devices located at a plurality of patient locations while at least one computing device is being used by a clinician who is supervising the patients' usage of each of the plurality of head mounted vision assist devices, wherein the at least one computing device is located remote to the plurality of patient locations, wherein a server computer is at least periodically communicatively coupled with each of the plurality of vision assist devices and the at least one computing device, and wherein the server computer comprises a processor and is coupled with a non-transient memory comprising programmatic instructions, the method being implemented by the server computer executing the programmatic instructions and comprising: causing results of one or more diagnostic tests conducted by the patients at the plurality of patient locations using the plurality of head mounted vision assist devices to be transmitted to the at least one computing device; mirroring displays associated with the plurality of plurality of head mounted vision assist devices on the at least one computing device to enable the clinician to monitor each of the patients' field of view; receiving a diagnosis of each of the patients, from the clinician, based on at least one of the results from the one or more diagnostic tests or the mirrored display of the field of view; and receiving at least one of a prescription or an instruction to perform a therapy in order to treat the patient based on the diagnosis.

Optionally, the clinician's computing device is located remote to the location of the server computer and at least some of the plurality of patient locations are located remote from each other.

Optionally, the processor is further programmed to execute the programmatic instructions to enable the patients and the clinician to remotely schedule consultation appointments, modify scheduled appointments, and/or cancel scheduled appointments.

Optionally, the processor is further programmed to execute the programmatic instructions to enable the clinician to remotely initiate and conduct a video call to a patient.

Optionally, when executed by the processor, the programmatic instructions mirror patients' displays on the clinician's at least one computing device by causing a display of one or more predefined variables corresponding to the patients' medical condition. Optionally, when executed by the processor, the programmatic instructions receive modifications to the displayed one or more predefined variables from the clinician and cause corresponding modifications to the one or more predefined variables in one or more of the plurality of head mounted vision assist devices in real time. Optionally, the corresponding modifications to the one or more predefined variables in one or more of the plurality of head mounted vision assist devices are experienced by one or more of the patients in real-time and are mirrored to the at least one computer in real time in order to be seen by the clinician.

Optionally, when executed by the processor, the programmatic instructions automatically adjust at least one of a type of a diagnostic test or a frequency of a diagnostic test presented to patients based upon results of the one or more diagnostic tests.

Optionally, when executed by the processor, the programmatic instructions generate notifications and cause the notifications to be transmitted to the clinician based upon results of the one or more diagnostic tests indicating vision changes in the patients.

Optionally, at least one of the diagnostic tests comprise an environmental test to determine light exposure in the patients' surroundings.

Optionally, when executed by the processor, the programmatic instructions cause said results of one or more diagnostic tests conducted by the patients at the plurality of patient locations using the plurality of head mounted vision assist devices to be automatically transmitted to the at least one computing device at predefined intervals.

Optionally, when executed by the processor, the programmatic instructions mirror displays associated with the plurality of plurality of head mounted vision assist devices on the at least one computing device to enable the clinician to monitor each of the patients' field of view in real-time.

Optionally, when executed by the processor, the programmatic instructions mirror displays associated with the plurality of head mounted vision assist devices on the at least one computing device to enable the clinician to monitor what the patients experienced in their fields of view at some earlier point in time.

In some embodiments, the present specification discloses a system for remote management of head mounted vision assist devices being used by patients, the system comprising: a plurality of head mounted vision assist devices located at a plurality of patient locations; at least one computing device being used by a clinician medically supervising use of the vision assist devices by the patients; a server computer communicatively coupled with each of the plurality of vision assist devices and the at least one computing device being used by the clinician, the server computer being coupled with a memory comprising stored programmatic instructions, the processor programmed to execute the stored instructions for enabling the clinician to remotely: monitor results of one or more diagnostic tests conducted by a patient at predefined time intervals; monitor a display of a head mounted vision assist device being used by the patient by mirroring the patient's display on the clinician's computing device; diagnose the patient based on at least one of: the test results and the mirrored display; and provide one or more of: prescription and therapy to treat the patient based on the diagnosis.

Optionally, the clinician's computing device is located remote to the plurality of patient locations and a location of the server computer.

Optionally, the processor is further programmed to execute the stored instructions for enabling the patients and the clinician to remotely set up consultation appointments, modify the appointments, and cancel the appointments.

Optionally, the processor is further programmed to execute the stored instructions for enabling the clinician to remotely make a video call to a patient for diagnosing the patient.

Optionally, mirroring the patient's display on the clinician's computing device comprises displaying one or more predefined variables corresponding to the patient's medical condition for evaluation by the clinician.

Optionally, changes made to the displayed variables by the clinician cause corresponding changes in the display of the patient's vision assist device to be made in real time.

Optionally, the changes in the display of the patient's vision assist device made in real time are seen by the clinician via the mirroring of the patient's display, and wherein the clinician diagnoses the patient based on said changes.

Optionally, the processor is further programmed to execute the stored instructions for enabling the clinician to remotely modify the diagnosis based on changes results of the one or more diagnostic tests conducted by the patient.

Optionally, the processor is further programmed to execute the stored instructions for automatically adjusting at least one of: a type or frequency of a diagnostic test conducted by the patient if a result of the one or more diagnostic tests conducted by the patient indicates a condition change in the patient.

Optionally, the processor is further programmed to execute the stored instructions for generating a notification to alert the clinician if a result of the one or more diagnostic tests conducted by the patient indicates a condition change in the patient.

Optionally, the processor is further programmed to execute the stored instructions for modifying the patient diagnosis based on generating a notification to alert the clinician if a result of the one or more diagnostic tests conducted by the patient indicates a condition change in the patient.

Optionally, the diagnostic tests comprise an environmental test to determine light exposure in the patient's surroundings.

In some embodiments, the present specification describes a method for remote management of head mounted vision assist devices being used by patients, wherein a plurality of head mounted vision assist devices being located at a plurality of patient locations are coupled with at least one computing device being used by a clinician via a server computer communicatively coupled with each of the plurality of vision assist devices and the at least one computing device, the method comprising the clinician via the computing device: monitoring results of one or more diagnostic tests conducted by a patient at predefined time intervals; monitoring a display of a head mounted vision assist device being used by the patient by mirroring the patient's display on the computing device; diagnosing the patient based on at least one of: the test results and the mirrored display; and providing one or more of: prescription and therapy to treat the patient based on the diagnosis.

Optionally, the clinician's computing device is located remote to the plurality of patient locations and a location of the server computer.

Optionally, the method further comprises setting by the clinician consultation appointments; modifying the appointments; and canceling the appointments, remotely.

Optionally, the method further comprises the clinician remotely making a video call to a patient for diagnosing the patient.

Optionally, mirroring the patient's display on the clinician's computing device comprises displaying one or more predefined variables corresponding to the patient's medical condition for evaluation by the clinician.

Optionally, changes made to the displayed variables by the clinician cause corresponding changes to be made in real time in the display of the patient's vision assist device.

Optionally, the changes in the display of the patient's vision assist device made in real time are seen by the clinician via the mirroring of the patient's display, and wherein the clinician diagnoses the patient based on said changes.

Optionally, the method comprises automatically adjusting at least one of: a type or frequency of a diagnostic test conducted by the patient if a result of the one or more diagnostic tests conducted by the patient indicates a condition change in the patient.

The aforementioned and other embodiments of the present specification shall be described in greater depth in the drawings and detailed description provided below.

BRIEF DESCRIPTION OF THE DRAWINGS

These and other features and advantages of the present invention will be further appreciated, as they become better understood by reference to the detailed description when considered in connection with the accompanying drawings:

FIG. 1C illustrates body of a goggle that may be used with the device of FIG. 1A, in accordance with some embodiments of the present specification;

FIG. 1I illustrates a screenshot of a clinician portal displaying a settings window for modifying display variables of a user device in accordance with embodiments of the present specification;

FIG. 3C is a diagram of FIG. 3B, in accordance with an embodiment of the present specification;

FIG. 3H is a modular diagram of the graphical user interface that is made available to a clinician for managing patient notes, in accordance with an embodiment of the present specification;

FIG. 3I is a modular diagram of the graphical user interface that is made available to a clinician for managing patient codes, in accordance with an embodiment of the present specification;

FIG. 3J is a modular diagram of the graphical user interface that is made available to a clinician for making remote diagnosis of patients via video calls, in accordance with an embodiment of the present specification;

FIG. 3K is a modular diagram of the graphical user interface that is made available to a clinician for mirroring a patient's HMVADD screen for viewing the patient's display during a consultation session, in accordance with an embodiment of the present specification;

FIG. 3L is a modular diagram of the graphical user interface that may be used to monitor/manage patient/clinician usage of the HMVADD remote management system, in accordance with an embodiment of the present specification;

FIG. 4B is a modular diagram of the graphical user interface of an exemplary welcome message sent to a new user of the remote management system, asking the user to download a corresponding mobile application, in accordance with an embodiment of the present specification;

FIG. 4C is a modular diagram of the graphical user interface of an exemplary account creation screen presented to a new user, of the remote management system, in accordance with an embodiment of the present specification;

FIG. 4D is a modular diagram of the graphical user interface of an exemplary account information confirmation screen presented to a new user, of the remote management system, in accordance with an embodiment of the present specification;

FIG. 4E is a modular diagram of the graphical user interface of an exemplary onboard screen presented to a new user, of the remote management system, in accordance with an embodiment of the present specification;

DETAILED DESCRIPTION

Figure 1A:
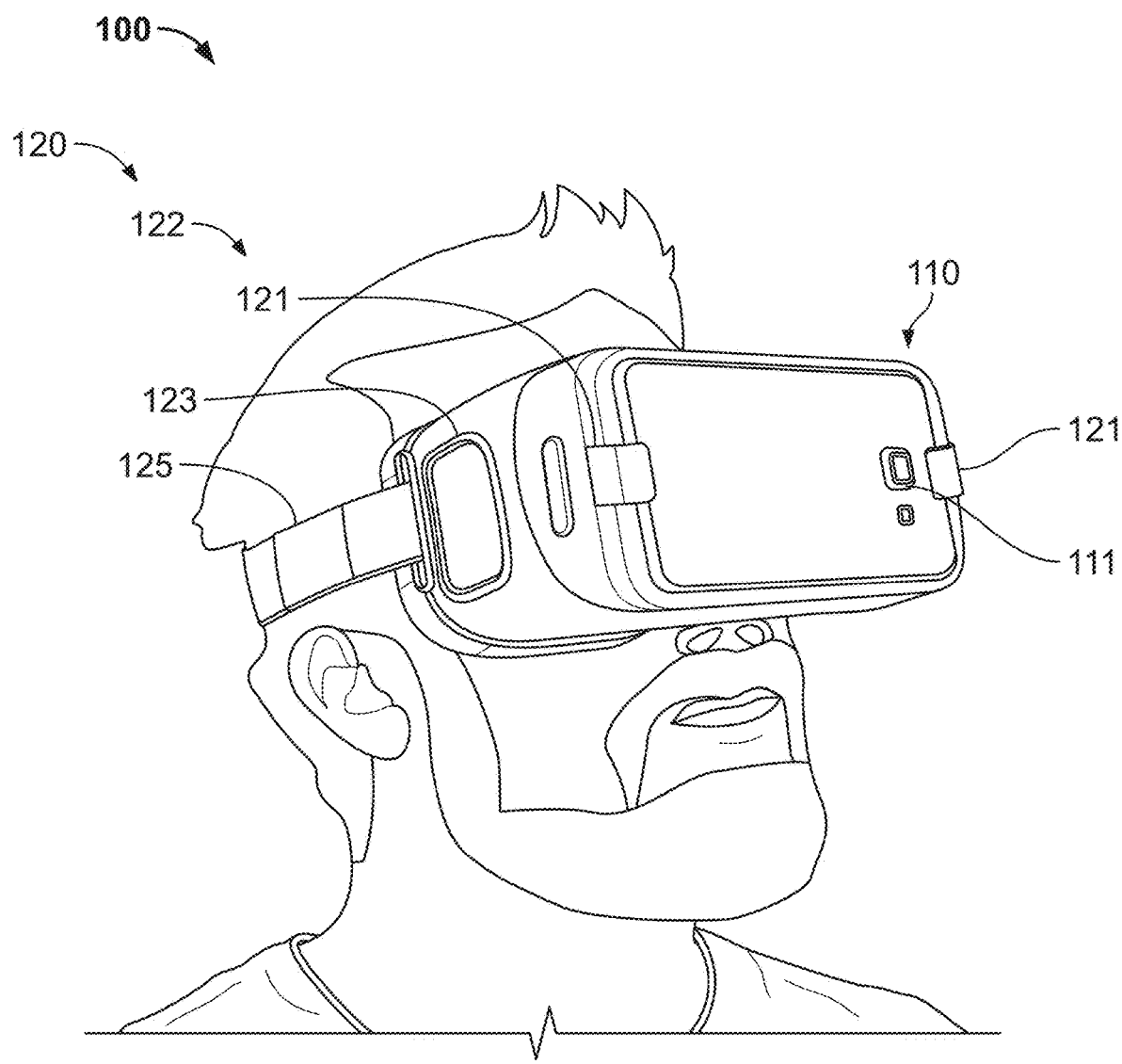
FIG. 1A illustrates an exemplary embodiment of a head mounted vision assist and diagnostic device (HMVADD) being used by a user, in accordance with some embodiments of the present specification.

Embodiments of the present specification provide systems and methods for vision enhancement as well as evaluating vision acuity of a user. A head-mounted video camera, a processor, and a display are all integrated within a head-mounted vision assist and/or diagnostic device (HMVADD) that may be worn by a user. The head-mounted device is configured to capture images of the environment and subject those images to specialized processing in order to diagnose and/or account for deficiencies in the user's eyesight. In embodiments, different modes of operating the device are provided that enable the user to configure the device for a specific application. In some embodiments, the modes of operation include at least an assistive mode, a diagnostic mode, and a therapeutic mode. Each mode of operation may include further options, where each option is dedicated to a specific processing approach, specific to an issue that the user may be facing.

In an embodiment, the present specification provides a HMVADD remote management system. In embodiments, each user's HMVADD is communicatively coupled with computing devices being monitored by one or more clinicians. In embodiments, a plurality of HMVADDs located at multiple user locations may be coupled with a central server located remotely from said user locations. The central server enables the data of each HMVADD to be accessed by one or more clinicians for monitoring the data for detecting vision problems, diagnosing vision-related conditions, and/or directing a user through vision therapies; via the clinicians' computing devices, wherein said devices may be located remotely from the central server and/or the HMVADDs.

In various embodiments, the HMVADD remote management system of the present specification comprises a central server which is a computing device having one or more processors or central processing unit (CPU), one or more computer-readable storage media such as RAM, hard disk, or any other optical or magnetic media, a controller such as an input/output controller, at least one communication interface and a system memory. The system memory includes at least one random access memory (RAM) and at least one read-only memory (ROM). In embodiments, the memory includes a database for storing data, captured by the HMVADD devices, processing algorithms and data transmitted by the clinician computing devices. A plurality of functional and operational elements of the system is in communication with the central processing unit (CPU) of the server to enable operation of the computing device. In various embodiments, the server may be a conventional standalone computer or alternatively, the functions of the server may be distributed across a network of multiple computer systems and architectures and/or a cloud computing system. In some embodiments, execution of a plurality of sequences of programmatic instructions or code, which are stored in one or more non-volatile memories, enable or cause the CPU of the server to perform various functions and processes such as, for example, obtaining patient related information or performing patient related tasks such as, but not limited to those described with reference to FIGS. 3C-3L and 4B-4E. In alternate embodiments, hard-wired circuitry may be used in place of, or in combination with, software instructions for implementation of the processes of systems and methods described in this application. Thus, the systems and methods described are not limited to any specific combination of hardware and software.

While some processing steps are disclosed as being done in the server positioned separate from, or remote from, a computing device being used by a clinician, it should be appreciated that the server-based programmatic instructions may, instead, be performed by the clinician's computing device or local to the clinician's computing device.

The present specification is directed towards multiple embodiments. The following disclosure is provided in order to enable a person having ordinary skill in the art to practice the invention. Language used in this specification should not be interpreted as a general disavowal of any one specific embodiment or used to limit the claims beyond the meaning of the terms used therein. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

In the description and claims of the application, each of the words "comprise" "include" and "have", and forms thereof, are not necessarily limited to members in a list with which the words may be associated. It should be noted herein that any feature or component described in association with a specific embodiment may be used and implemented with any other embodiment unless clearly indicated otherwise.

Figure 1B:
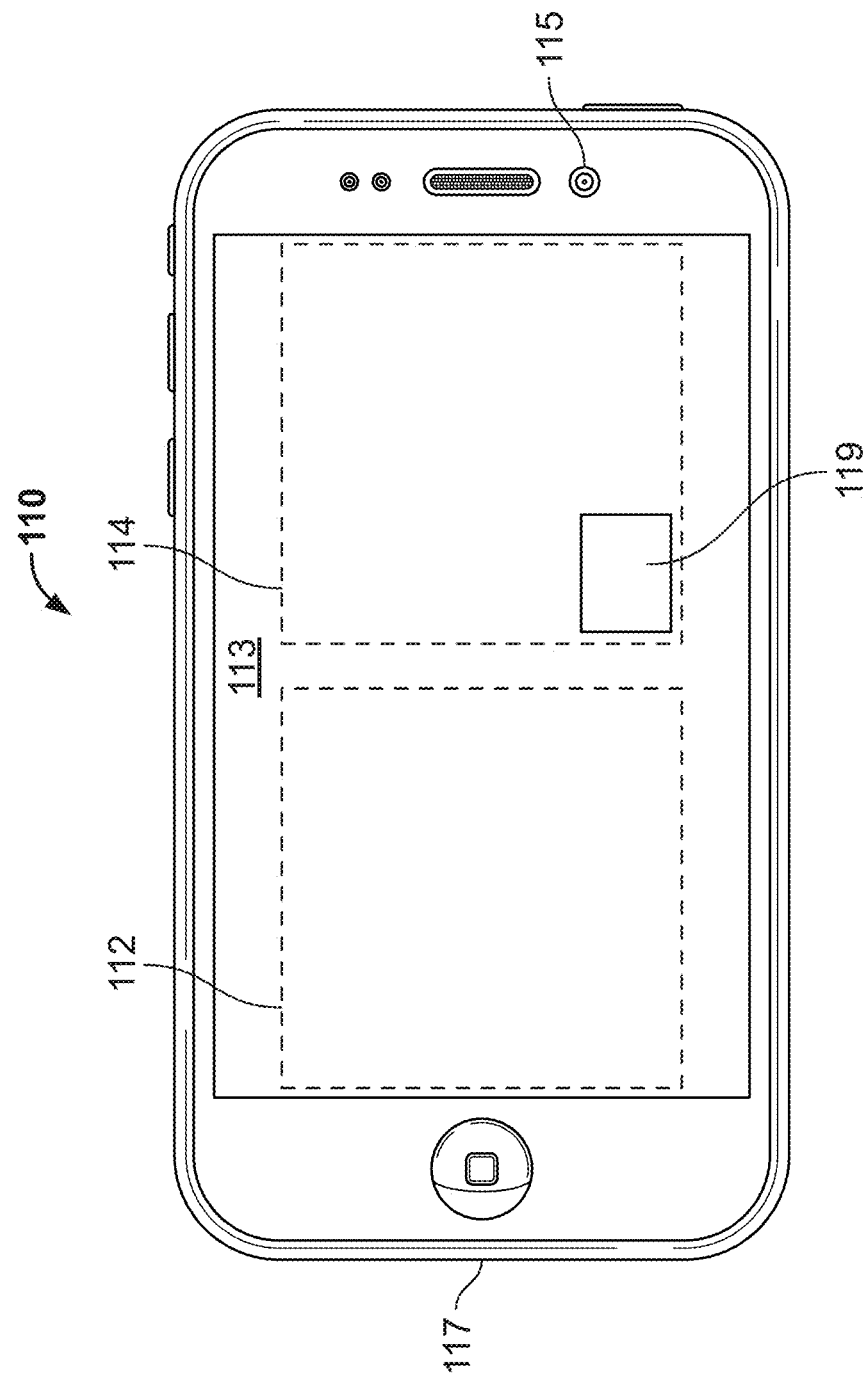
FIG. 1B illustrates a smartphone that may be used with the device of FIG. 1A, in accordance with some embodiments of the present specification.

By way of a specific embodiment, FIGS. 1A, 1B, and 1C show a first embodiment of a head-mounted vision assist and/or diagnostic device (HMVADD) 100, where FIG. 1A shows the HMVADD worn by a user, FIG. 1B shows a smartphone used in the HMVADD and FIG. 1C shows the body of the goggle used in the HMVADD. HMVADD 100 includes a smartphone 110 and pair of goggles 120. Smartphone 110 includes the electronics necessary for the HMVADD 100, including a processor and memory (not shown), a forward-facing camera 111, as shown in FIG. 1A, and a screen 113 on the side opposite of the camera, as shown in FIG. 1B. Smartphone 110 also includes an electrical connector 117 and may also include a backward facing camera 115, which may be used in certain embodiments. As described subsequently, processed camera images are displayed on one portion of screen 113 shown as a left area 112 and a second portion of the screen is shown as right area 114. Smartphone 110 may further comprise a plurality of programmatic instructions, which, when executed, implement one or more of the functional modules described herein.

Goggles 120 include a body 122 and a strap 125 for holding the goggles on the user's head and a connector 128 that mates with smartphone connector 117. Body 122 includes, as shown in FIG. 1A, a pair of clamps 121 for removably restraining smartphone 110 and making the electrical connection between connectors 117 and 128, and input device 123 for providing input to the smartphone through the connectors and, as shown in FIG. 1C, a left lens 124 and right lens 126 and a focusing wheel 127. When assembled as in FIG. 1A, with smartphone 110 held in place by clamps 121, HMVADD 100 presents what is displayed in area 112 of screen 113, through lens 124, to the user's left eye, and what is displayed in area 114 of the screen, through lens 126, to the user's right eye. The user may use focusing wheel 127 to adjust the focus. In certain embodiments, goggles 120 are adapted to accept user input from input device 123, which may control or otherwise provide inputs to the accepted smartphone 110.

In embodiments, smartphone 110 is provided with programming, as through a vision-enhancement application (referred to herein as a "VE App") which can: operate camera 111 in a video mode to capture a stream of "input images"; perform image processing on each input image to generate a stream of "output images"; and present the stream of output images to screen 113. In certain embodiments, each of the stream of output images is presented sequentially side-by-side as two identical images—one in area 112 and one in area 114. Further, it is preferred that HMVADD 100 operates so that the time delay between when the input images are obtained and when the output images are provided to screen 113, is as short as possible so that a user may safely walk and interact with the environment with goggles 120 covering their eyes.

In certain embodiments, the VE App may also provide a menu of options that allow for the modification of how HMVADD 100 processes and generates an output image from an input image. Thus, for example, HMVADD 100 may execute image-processing algorithms having parameters, where the parameters are changeable through the menu by, for example, setting parameter values for magnification, or the size and shape of magnification of the output image.

HMVADD 100 has adjustable features that allow it to match the physiology of the user for use in different settings. These features are generally set once for each user, possibly with the need for periodic adjustment. Thus, for example, given the spacing between screen 113 and the eyes of user U, focusing wheel 127 permits for an optimal setting of the distance to lens 124 and 126. In addition, lens 124 and/or 126 may include refractive error correction. Further, it is important that the viewed spacing between the images in areas 112 and 114 match the user's Inter Pupillary Distance (IPD). This may be accounted for, by example, by shifting the spacing of the output images in areas 112 and 114 to match the IPD.

In various embodiments, the user may adjust setting using input device 123, which may be a touchpad, and which is electrically connected to smartphone 110, which is further programmed to modify the VE App according to such inputs; a Bluetooth game controller that communicates with the smartphone 110 via Bluetooth; voice control using the microphone of the phone; or gesture control using available devices such as the NOD gesture control ring.

In addition, there are other features of HMVADD 100 that can either be set up once for a user or may be user-adjustable. These features may include, but are not limited to, adjustments to the magnitude, shape, size, or placement of minified or magnified portions of the output image, and color enhancement functions such as contrast, blur, ambient light level or edge enhancement of the entire image or portions of the image. In some embodiments, color and color sensitivity may be set or adjusted based on a plurality of different controls. In some embodiments, color and/or color sensitivity may be adjusted by the user. In some embodiments, color and/or color sensitivity adjustments are performed by the system to optimize colors. In other embodiments, the compass and/or accelerometers within smartphone 110 may be used for enhancing orientation, location, or positioning of output images.

In certain embodiments, sound and/or vibration may be provided on smartphone 110 to generate for proximity and hazard cues. In other embodiments, the microphone of smartphone 110 can be used to enter voice commands to modify the VE App. In certain other embodiments, image stabilization features or programming of smartphone 110 are used to generate output images.

In one embodiment, by way of example only, goggles 120 are commercially available virtual-reality goggles, such as Samsung Gear VR (Samsung Electronics Co. Ltd., Ridgefield Park, NJ) and smartphone 110 is a Galaxy Note 4 (Samsung Electronics Co. Ltd., Ridgefield Park, NJ). The Samsung Gear VR includes a micro USB to provide an electrical connection to the Galaxy Note 4 and has, as input devices 123, a touch pad and buttons.

It will be understood by those in the field that HMVADD 100 may, instead of including a combination of smartphone and goggles, be formed from a single device which includes one or more cameras, a processor, display device, and lenses that provide an image to each eye of the user. In an alternative embodiment, some of the components are head-mounted and the other components are in communication with the head-mounted components using wired or wireless communication. Thus, for example, the screen and, optionally the camera, may be head-mounted, while the processor communicates with the screen and camera using wired or wireless communication. In such an embodiment, an integrated processor and memory would comprise a plurality of programmatic instructions which, when executed, implement one or more of the functional modules described herein.

Further, it will be understood that other combinations of elements may form the HMVADD 100. Thus, an electronic device which is not a smartphone, but which has a processor, memory, camera, and display may be mounted in goggles 120. Alternatively, some of the electronic features described as being included in smartphone 110 may be included in goggles 120, such as the display or communications capabilities. Further, the input control provided by input device 123 may be provided by a remote-control unit that is in communication with smartphone 110.

Figure 1D:
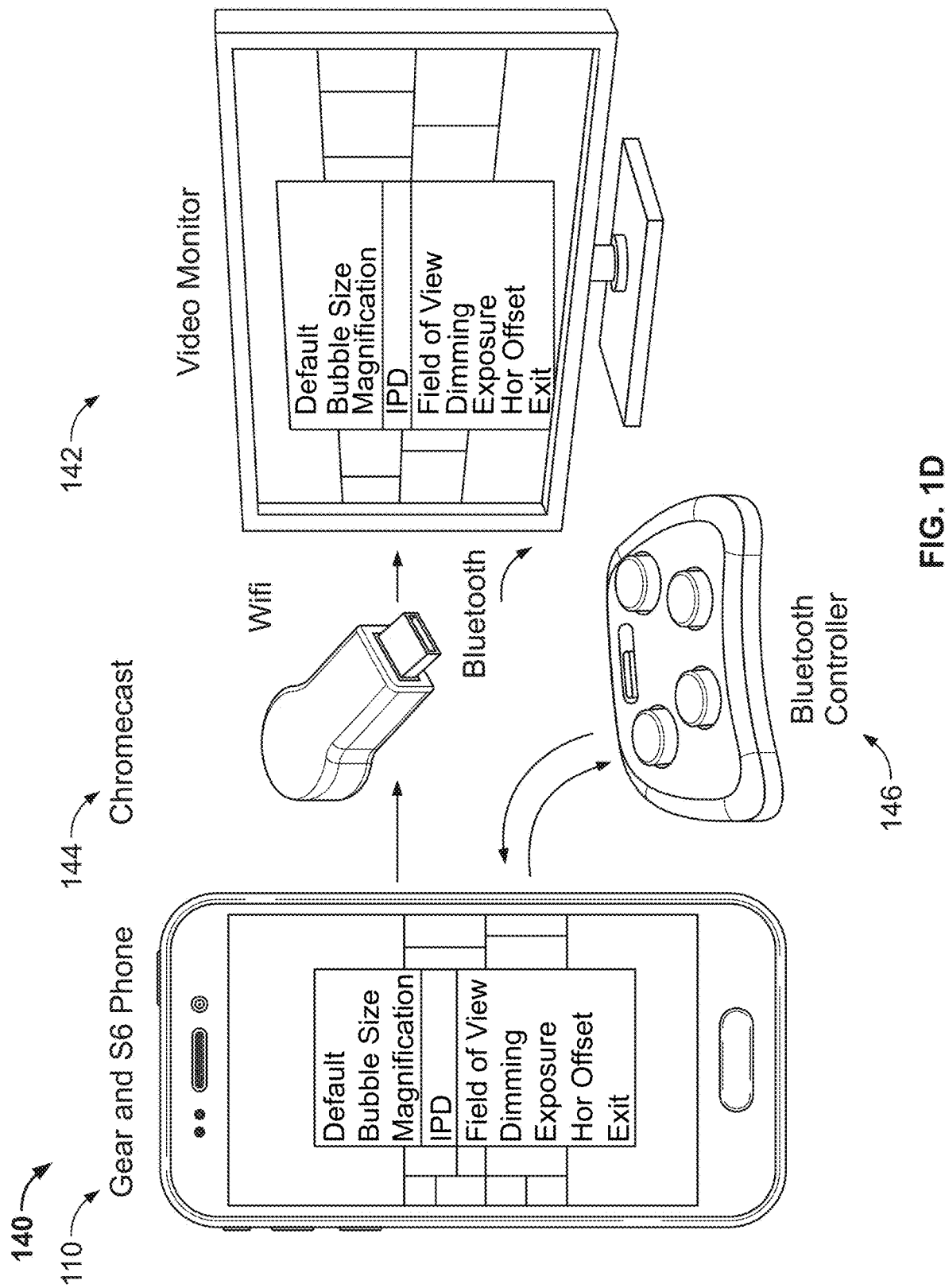
FIG. 1D illustrates an exemplary system environment including devices that may communicate with the device of FIG. 1A, in accordance with some embodiments of the present specification.
Figure 1E:
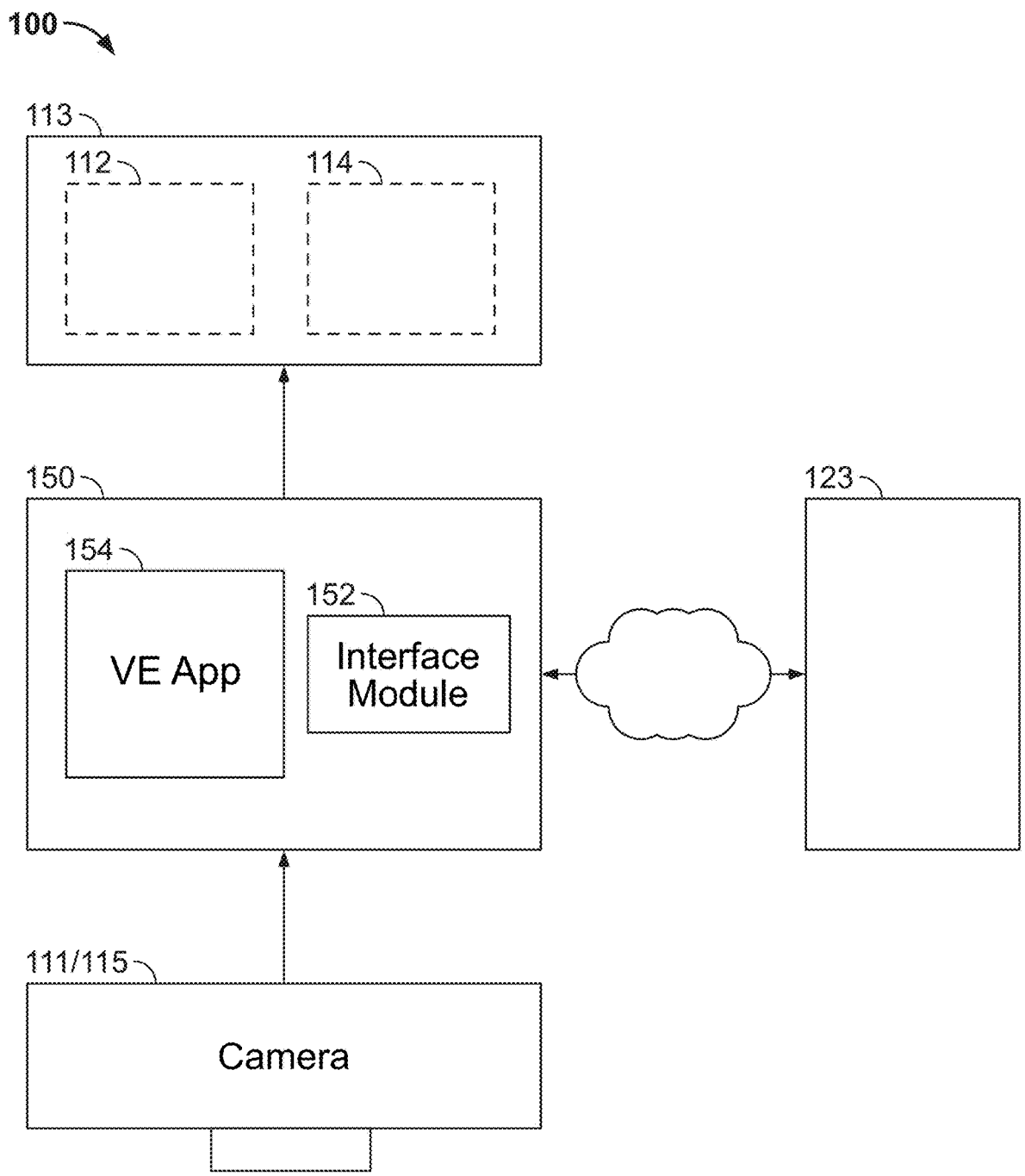
FIG. 1E illustrates a block drawing of the components of an exemplary vision assist system using the device of FIG. 1A, in accordance with some embodiments of the present specification.

FIG. 1E illustrates an exemplary set of system components that may be incorporated in the vision enhancement system 100, in accordance with some embodiments of the present specification. In embodiments, the system components are integrated with a pair of smart goggle, or a smartphone with an attachment that enables a user to wear the smartphone like goggles. In embodiments, the system components of vision enhancement system 100 may communicate with a user interface 123 that is integrated with its components, or externally connected to the system 100 through a wired or a wireless communication means. In some embodiments, the interface is one or a combination of a touchpad, a voice interface, an optical interface, a motion or gesture sensor, or any other type of interface. Camera 111 and backward camera 115 are configured to receive images, which are processed by a processing unit 150. In some embodiments, processing unit 150 comprises one or more software modules, including an interface module 152 and VE App 154, which include a programmed set of instructions for processing the input signals received by the interface module 152 from the user interface, in accordance with the instructions of the VE App 154.

In some embodiments, execution of a plurality of sequences of programmatic instructions or code enables or causes the CPU of the processing unit 150 to perform various functions and processes. The processing unit 150 may be any computing device having one or more processors and one or more computer-readable storage media such as RAM, hard disk or any other optical or magnetic media. In alternate embodiments, hard-wired circuitry may be used in place of, or in combination with, software instructions for implementation of the processes of systems and methods described in this application. Thus, the systems and methods described are not limited to any specific combination of hardware and software.

FIG. 1D illustrates, without limitation, one embodiment of a clinical setup 140 that a clinician may use to configure HMVADD 100. Clinical setup 140 may allow a user or a clinician to determine and setup the VE App by setting an IPD, the field of view (FoV), background dimming, ambient light level, as well as parameters that are also user-adjustable, such as the size, shape, magnification, and location of enhanced vision features, such as the magnification bubble described subsequently. The setup may also be used by the user and/or the clinician, or any other medical or non-medical person caring for the user, to diagnose the user's vision and configure the VE App to assist the user with and/or provide therapeutic treatments to the user for, user-specific vision-related issues.

Clinical setup 140 thus allows for the adjustment of parameters within, or used by, the VE App that smartphone 110 runs to implement the HMVADD 100. Clinical setup 140 includes a monitor 142, a Wi-Fi device 144 to allow screen 113 of smartphone 110 to be displayed on the monitor, and a Bluetooth controller 146 to communicate via Bluetooth with smartphone 110. In general, clinical setup 140 accepts a video output from smartphone 110 of display 113, and projects what the user would see when using HMVADD 100 on monitor 142.

In certain embodiments, features or aspects of the present HMVADD 100 may be adjusted by a clinician using clinical setup 140. Using the HMVADD 100, screen 113 of smartphone 110 is mirrored on monitor 142, using Wi-Fi device 144, for example, so that the clinician can view what the user is viewing in HMVADD 100. In some embodiments, the screen 113 is mirrored to enable the clinician to monitor the user's field of view in real time. In some embodiments, the screen 113 is mirrored to enable the clinician to monitor what the user is experiencing in his/her field of view currently or in real-time as well as to monitor what the user experienced in his/her field of view at some earlier point in time.

In embodiments, Wi-Fi device 144 may refer to any other type of communication device enabling communication between the vision enhancement system 100 and one or more remote computing devices. The VE App on smartphone 110 includes a menu that allows for the selection of certain parameters that operate HMVADD 100.

The clinician has access to the commands in the menu of the VE App via remote Bluetooth controller 146. In this way, the clinician can "tune" the device to the specific visual demands of the user.

In certain embodiments, Wi-Fi device 144 can be used to remotely add, augment or modify functions that allow vision-enhancements, mirror the display, monitor and control VE App configurations in a clinical environment. In certain embodiments, Bluetooth controller 146 can be used to control or modify visual enhancement functions. In certain other embodiments, the VE App may be reconfigured in a purely magnified format, making it possible for the low vision user to place phone calls, utilize maps, read announcements and perform all visual functions currently available to those with normal vision.

In some embodiments, the screen 113 is mirrored to enable display of one or more predefined variables corresponding to the user's medical condition. The clinician may modify the one or more predefined variables and these modifications are then reflected in the HMVADD 100 in real time. In some embodiments, these modifications to the one or more predefined variables in the HMVADD 100 are experienced by the user in real-time and are mirrored to the clinician's computing device in real time in order to be seen by the clinician.

Figure 1F:
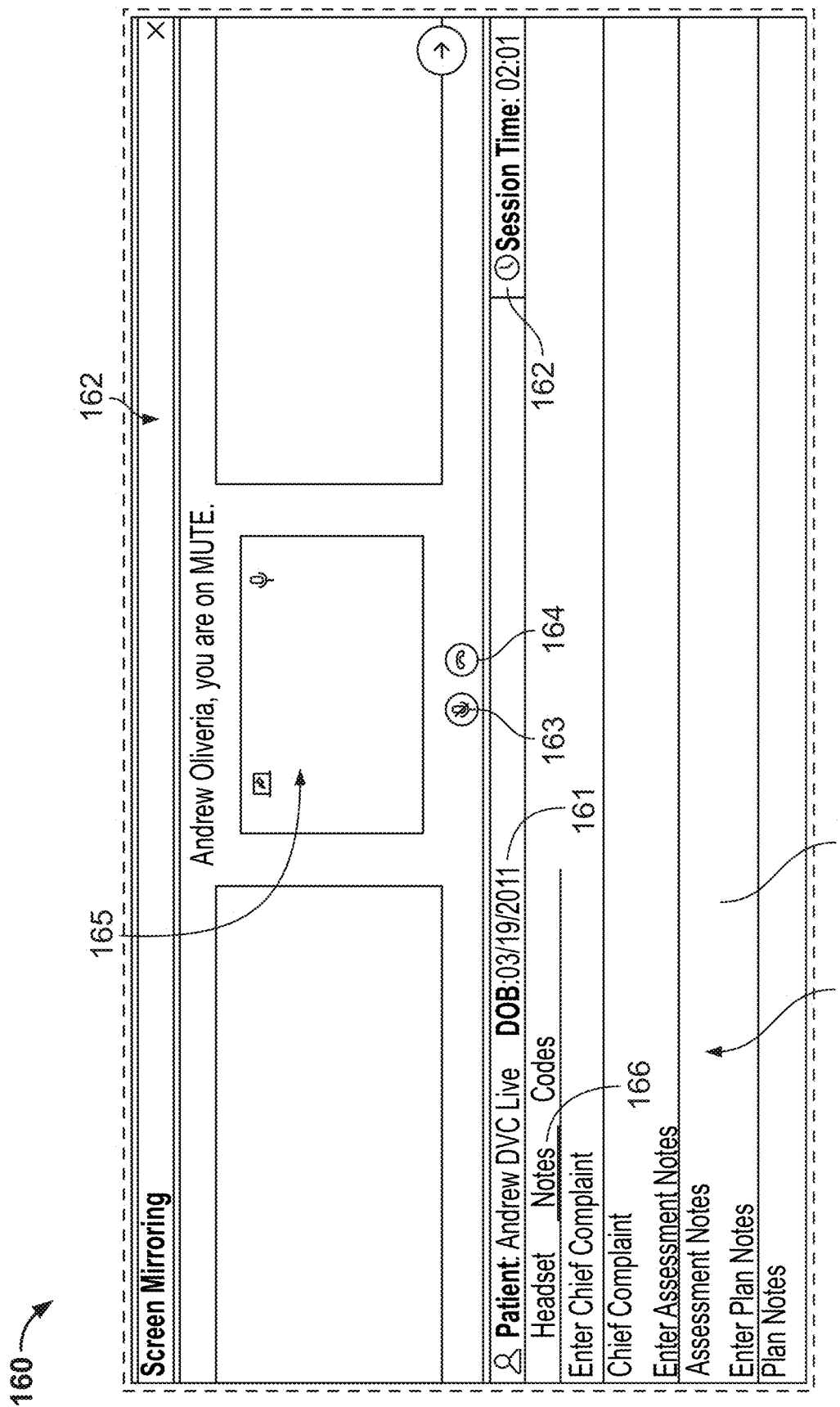
FIG. 1F illustrates a screenshot of a clinician portal in accordance with some embodiments of the present specification.

In some embodiments, the clinical setup 140 provides the clinician with a system, or clinician portal, for mirroring the screen 113 of the user and also presenting to the clinician one or more subsystems for viewing data management and allowing clinician modification of the user's device. FIG. 1F illustrates a screenshot of a clinician portal 160 in accordance with some embodiments of the present specification. In embodiments, the clinician portal 160 displays patient information 161, such as name and date of birth, and the session time 162 for the consultation session of the user with the clinician. The clinician portal 160 also presents the clinician with a mute icon 163 for muting voice and a phone icon 164 for ending the session. In various embodiments, the clinician portal 160 or system includes at least two primary subsystems. A first subsystem, comprising a diagnostic test prescription and data management subsystem, is used by the clinician to prescribe to the patient, and view results from, certain diagnostic tests. In some embodiments, the diagnostic tests include contrast sensitivity, visual acuity, and/or Amsler grid tests. Once prescribed, the tests are presented to the user on their screen 113 and the user performs the tests offline. Data results from the tests are transmitted back to a server (for example, central server 204 discussed below with respect to FIG. 2). The server stores the data and presents it to the clinician via the clinician portal 160 when requested.

A second subsystem, comprising a remote management of patient devices subsystem, provides a multi-window GUI 162 for remote management of one or more patient devices by the clinician. In some embodiments, the remote management of patient devices subsystem GUI 162 comprises a first window 165 that mirrors what the user or patient actually sees on screen 113 of his or her device. In embodiments, the first window 165 is viewable in one of a plurality of different viewing modes. The viewing modes include, in certain embodiments, TV mode, scene mode, reading mode, and retinitis pigmentosa mode. The TV mode is optimized for high resolution, vibrant color, and relatively stationary images. The scene mode is optimized for high resolution, vibrant color, and dynamically moving images. The reading mode is optimized for text reading and, in some embodiments, is in black and white with high contrast. The retinitis pigmentosa mode is configured to modulate a field of view to account for a minified field of view of patients with retinitis pigmentosa.

Figure 1G:
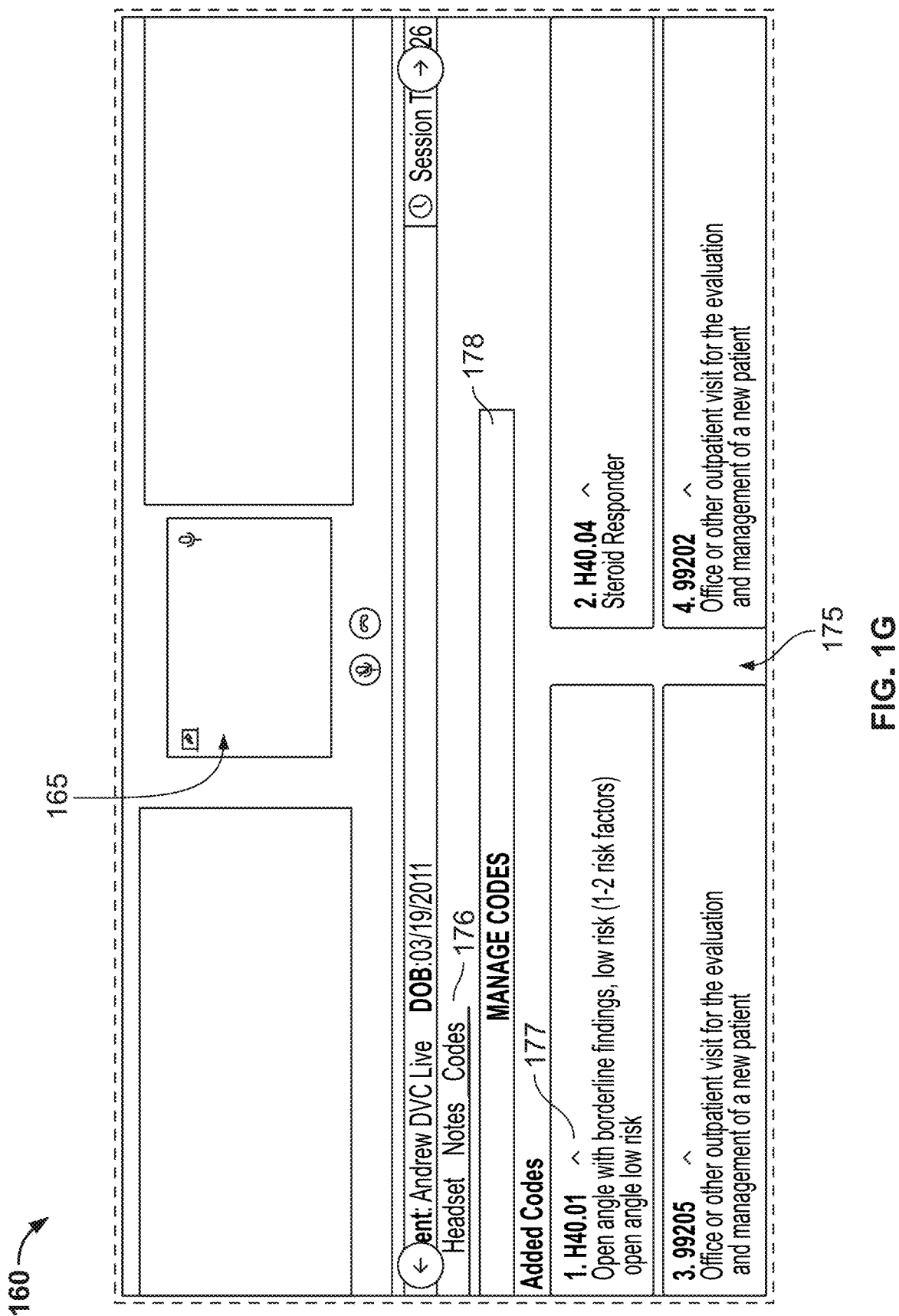
FIG. 1G illustrates a screenshot of a clinician portal displaying a codes window in accordance with some embodiments of the present specification.
Figure 1H:
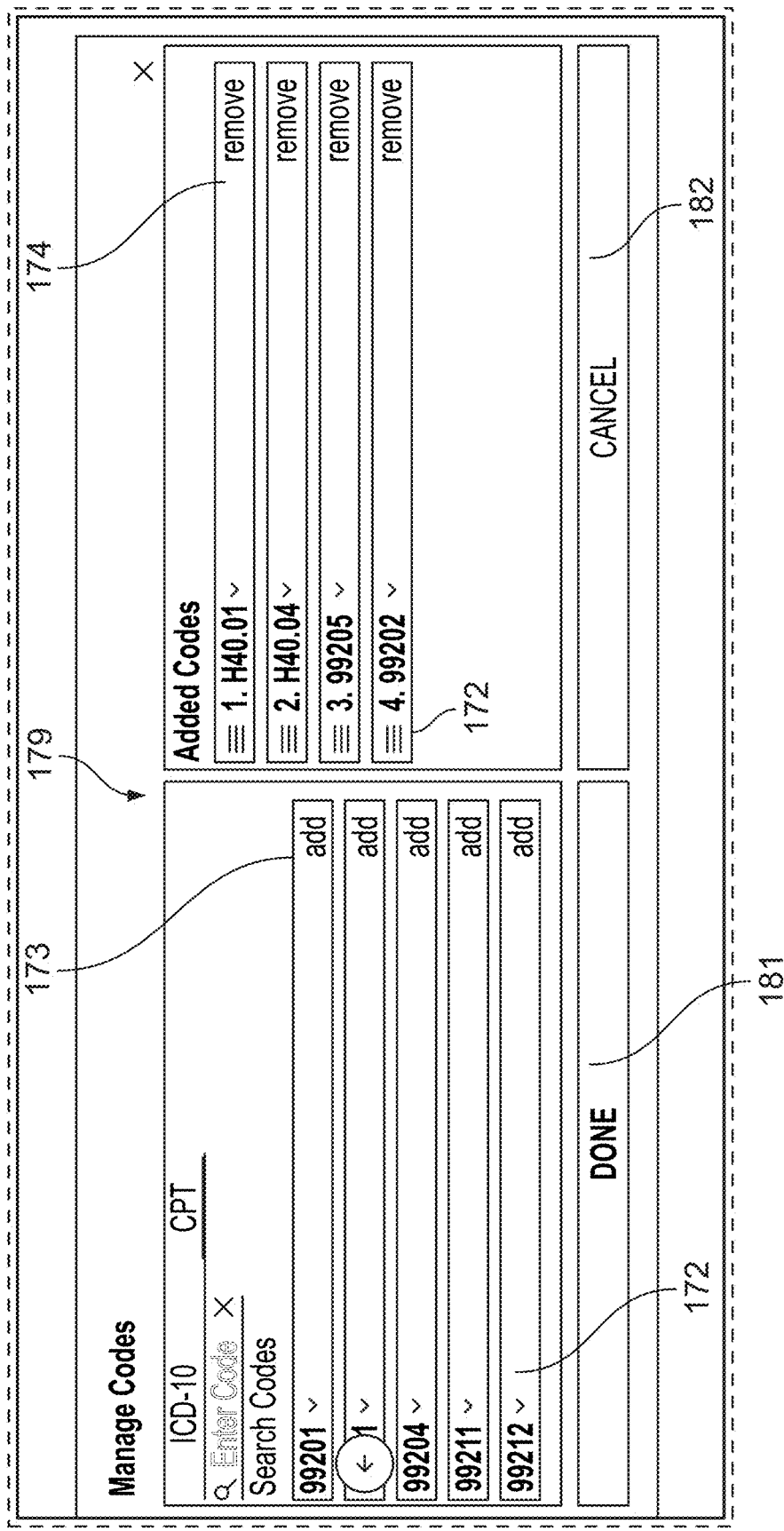
FIG. 1H illustrates a screenshot of a clinician portal displaying a codes sub-window in accordance with some embodiments of the present specification.
Figure 11:
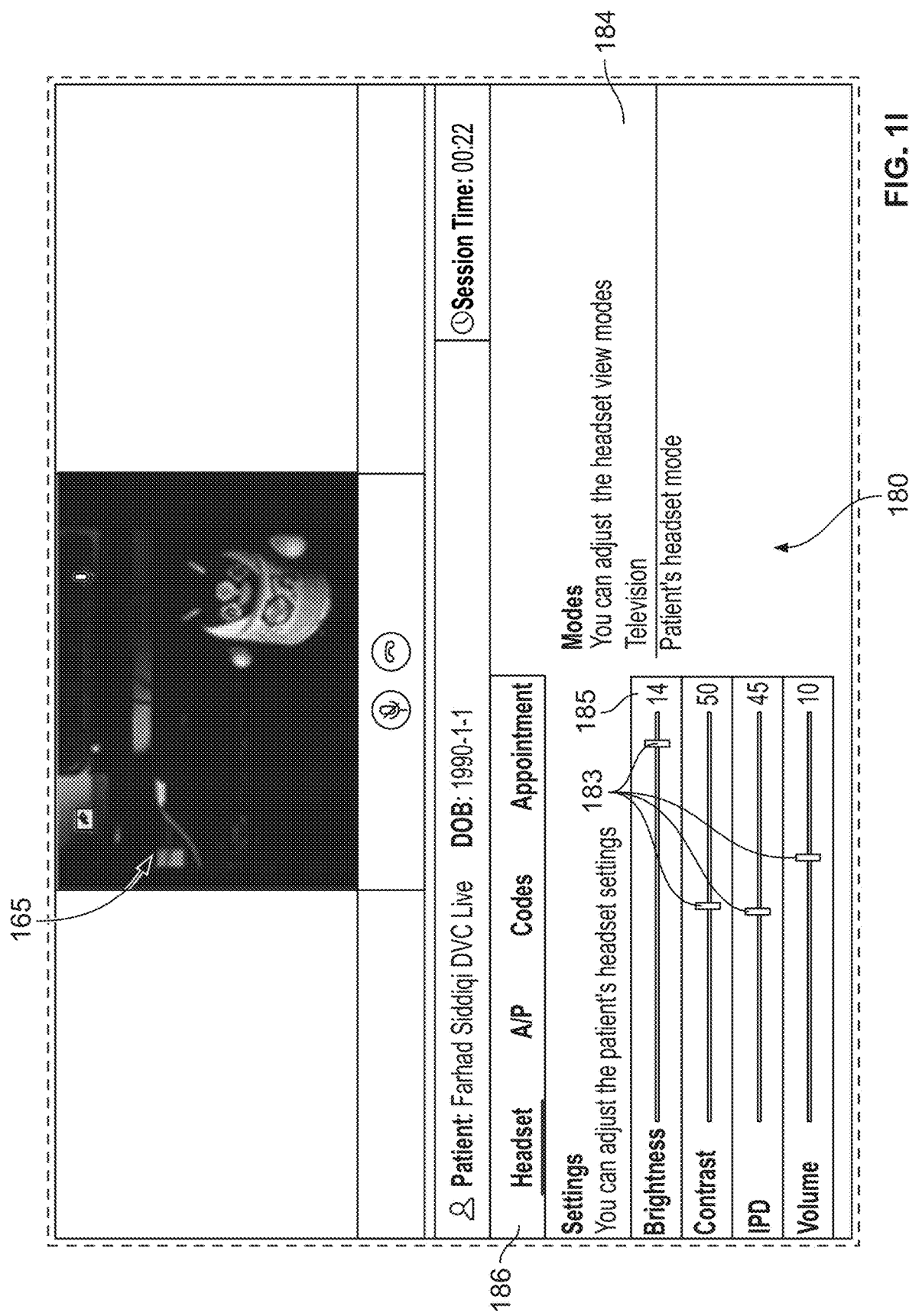

A second window 170 provides a space 171 within which the clinician can input assessment and planning notes associated with the data captured in each of the other windows. In embodiments, the clinician may enters notes such as chief complaint notes, assessment notes, and plan notes. In some embodiments, the second window 170 is positioned in a lower portion of the clinician portal 160 display, below the first window 165, and may be accessed by clicking on a notes icon or tab 166. The system is configured to look up, in a database, and store medical record data relating to the assessment and planning notes entered in the second window 170. Referring to FIG. 1G, a third window 175 displayed the stored medical record data relating to the assessment and planning notes provided in the second window 170. For example, in embodiments, the system is configured to look up the relevant diagnostic and treatment codes 177, such as current procedural terminology (CPT) codes, and display this information in the third window 175. In some embodiments, the third window 175 is positioned in a lower portion of the clinician portal 160 display, below the first window 165, and may be accessed by clicking on a codes icon or tab 176. In some embodiments, the third window 175 replaces the second window 170 when selected. In some embodiments, the clinician can manage codes generated by the system by selecting a manage icon 178 in the third window, which causes a codes sub-window 179 to open, as shown in FIG. 1H. The clinician can edit the codes stored in the system for the patient in the codes sub-window 179. A listing of codes 172 is provided, and the clinician can add or remove codes by selecting the appropriate add icon 173 or remove icon 174, and click a done icon 181 to accept changes and return to the third window 175, or click a cancel icon 182 to reject the changes and return to the third window 175.

In embodiments, referring to FIG. 1I, a fourth window 180 of the remote management of patient devices subsystem presents the clinician with a plurality of icons or sliders 183 that are configured to change display variables of the first window 165 when actuated. In various embodiments, display variables that can be changed using the sliders 183 include brightness, contrast, interpupillary distance (IPD), and volume. In some embodiments, a number 185 is displayed in line with each slider 183 to indicate a numerical value, for example, between 0 and 100, of the particular display variable. The affected display variables are specific to the viewing mode being shown in the first window 165. In some embodiments, the fourth window 180 is positioned in a lower portion of the clinician portal 160 display, below the first window 165, and may be accessed by clicking on a headset icon or tab 186. In some embodiments, the fourth window 180 replaces the second window 170 or third window 175 when selected.

In some embodiments, the viewing mode may be selected using a dropdown arrow menu 184 in the fourth window 180. In embodiments, when the first window 165 is in TV mode, the fourth window 180 includes sliders which are configured to, when actuated, cause the system to increase or decrease a brightness, contrast, hue, or saturation of the display of the first window. In embodiments, when the first window 165 is in scene mode, the fourth window 180 includes sliders which are configured to, when actuated, cause the system to increase or decrease a rate of frames per second of a displayed video, or increase or decrease a brightness, contrast, hue, or saturation of the display of the first window. In embodiments, when the first window 165 is in reading mode, the fourth window 180 includes sliders which are configured to, when actuated, cause the system to increase or decrease a brightness or contrast of the display of the first window or change a display of the first window between monochrome and color or between a white foreground with a black background and a black foreground with a white background. In some embodiments, when the first window 165 is in reading mode, the fourth window 180 includes sliders which are configured to, when actuated, cause the system to apply a filter to the display. In some embodiments, the filter is a yellow filter. In embodiments, when the first window 165 is in retinitis pigmentosa mode, the fourth window 180 includes sliders which are configured to, when actuated, cause the system to change a field of view of the first window.

In some embodiments, the icons or sliders are global in that they are configured to change the same display variable across all four viewing modes. For example, in some embodiments, the fourth window includes sliders which are configured to, when actuated, cause a display magnification of the shown window to increase or decrease independent of viewing mode. In some embodiments, the fourth window includes sliders which are configured to, when actuated, change an interpupillary distance of the shown window independent of viewing mode. In some embodiments, specific display variables are unique to only one viewing mode. For example, changing between a white foreground with a black background and a black foreground with a white background may only be available in reading mode. Additionally, in some embodiments, default settings for display variables can be set by the clinician. For example, in retinitis pigmentosa mode, a particular field of view may be set as default and will be displayed each time when the first window is switched to retinitis pigmentosa mode. In reading mode, a particular contrast level or black background versus white foreground mix may be set to display each time reading mode is selected.

During operation, for example, during a consultation when a clinician is viewing a mirrored screen of a patient device as the user experiences images displayed on their device screen, the clinician can, based on the diagnostic test data collected and displayed in the first, second, and third windows, use the sliders to dynamically modify display variables presented to the user in real-time. For example, in embodiments, if a contrast sensitivity test taken by a user provides results which indicate that the user has poor contrast sensitivity, the clinician can actuate a contrast slider in the fourth window while the user is in TV viewing mode. The contrast slider may be used to increase or decrease screen contrast in TV viewing mode or across all modes. In embodiments, if a visual acuity test taken by a user provides results which indicate that the user has poor visual acuity, the clinician can actuate a magnification slider in the fourth window to increase a degree of magnification in all viewing modes. In another example, in embodiments, if an Amsler grid test taken by a user provides results which indicate that the user has a limited field of view, the clinician can actuate a field of view slider in the fourth window while the user is in retinitis pigmentosa viewing mode. The field of view slider may be used to change a field of view in retinitis pigmentosa viewing mode or across all modes.

The clinician portal 160 provides the clinician with the ability to dynamically modify display variables in a remote patient viewing device in real-time based on visual test data. Changes made to the display variables in the first window 165 of the clinician portal 160 (by the physician using the sliders 183 in the fourth window of the clinician portal 160) are transmitted to the patient device and these same changes are made to the display of the user device screen 113. Since the user's device screen 113 is being mirrored onto the first window 165 of the clinician portal, the changes then show up on the first window 165 as well, such that the same display is being viewed concurrently by the user on the device screen 113 and the clinician on the first window 165 of the clinician portal 160. As noted above, these changes will be dependent on which viewing mode is being shown in the first window. The clinician can therefore remotely gauge a patient's vision performance using the clinician portal and dynamically change display variables while the user experiences those changes as they are made in real-time. In some embodiments, to assist with communication between the user and the clinician, the screen 113 of the user device includes a small window (119 if FIG. 1B) to display a webcam video stream of the clinician during consultation.

In embodiments, vision enhancement system 100 enables a user to choose a specialized processing for its operation, each specialized processing offering vision solutions for different types of user requirements. In an embodiment, an assistive mode of operation is provided. In another embodiment, a diagnostic mode of operation is provided. In yet another embodiment, a therapeutic mode of operation is provided. A user may switch between different modes by using a button provided through an interface on screen 113 of smartphone 110, on monitor 142, or through any other type of interface in communication with the vision enhancement system 100.

Figure 2:
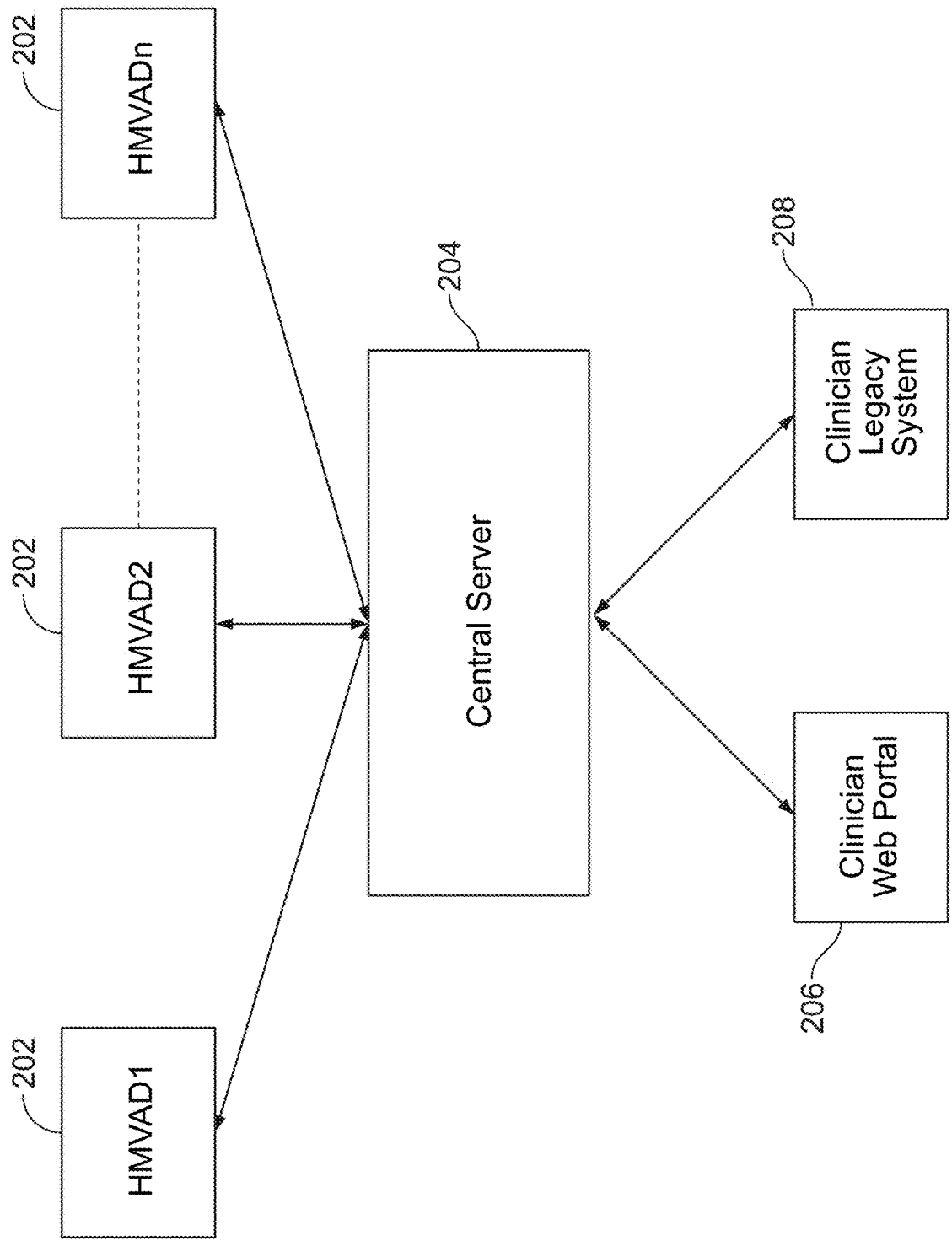
FIG. 2 is a block diagram of the HMVADD remote management system, in accordance with an embodiment of the present specification.

FIG. 2 is a block diagram of the HMVADD remote management system, in accordance with an embodiment of the present specification. In embodiments, a plurality of HMVADDs 202 located at multiple user locations are communicatively coupled with a central server 204 located remotely from said user locations. In some embodiments, at least some of the multiple user locations are located remote from each other. In an embodiment, the central server 204 enables data to be bi-directionality sent to, and received from, each HMVADD 202 and further enables such data to be accessed by one or more clinicians via a web portal 206 for monitoring said data for detecting vision problems, diagnosing vision-related conditions, and/or directing a user through vision therapies. In an embodiment, the data of each HMVADD 202 may be accessed by one or more clinician legacy systems 208 also communicatively coupled with the central server 204, wherein said legacy systems 208 may be located remotely from the central server 204 and/or the HMVADDs 202 and may comprise one or more computing devices configured to execute a plurality of programmatic instructions for tracking patient vision data, patient profiles, patient financial accounts, and other patient data. These systems manage electronic health records (EHR), which are also referred to as electronic medical records (EMR). Exemplary legacy systems include. Epic, offered by Epic Systems Corporation, based in Verona, Wisconsin, USA and Compulink offered by Compulink Healthcare solutions, based in Newbury Park, California, USA. Their systems store health records and allow access for the purpose of functions related to patient care, including registration and scheduling; clinical systems for doctors, nurses, emergency personnel, and other care providers; systems for lab technologists, pharmacists, and radiologists; and billing systems for insurers.

The central server 204 may further comprise a plurality of programmatic instructions which, when executed, implement one or more of the functional modules described herein and shown in, among other places, FIGS. 3A-3L and 4B-4E. The term 'module', as used in this disclosure, may refer to computer logic utilized to provide a desired functionality, service or operation by programming or controlling a general purpose processor. In various embodiments, a module can be implemented in hardware, firmware, software or any combination thereof. The module may be interchangeably used with unit, logic, logical block, component, or circuit, for example. The module may be the minimum unit, or part thereof, which performs one or more particular functions.

Figure 3A:
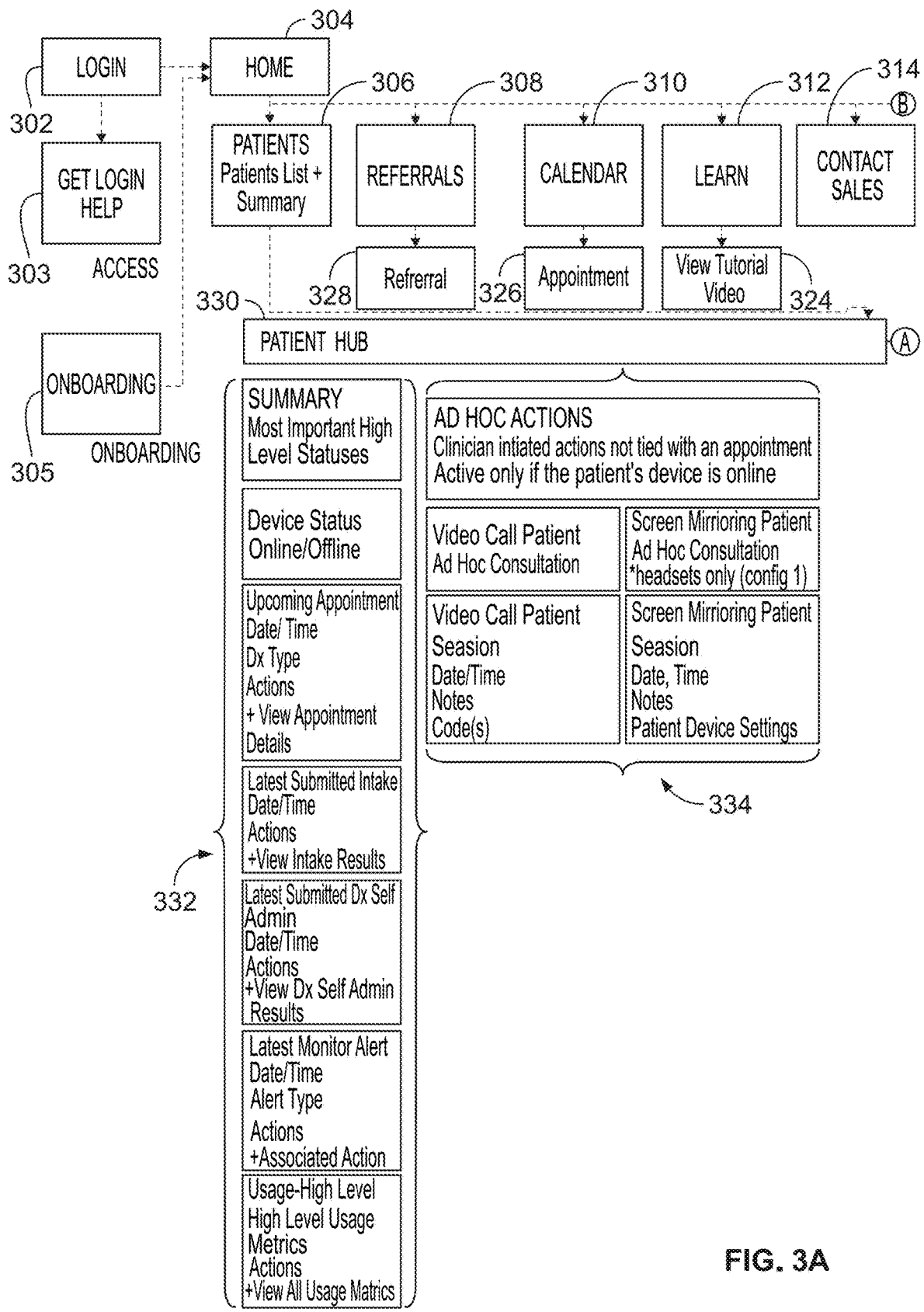
FIG. 3A is a block diagram illustrating a plurality of options/modules presented to a user of the HMVADD remote management system, in accordance with some embodiments of the present specification.
Figure 3A:
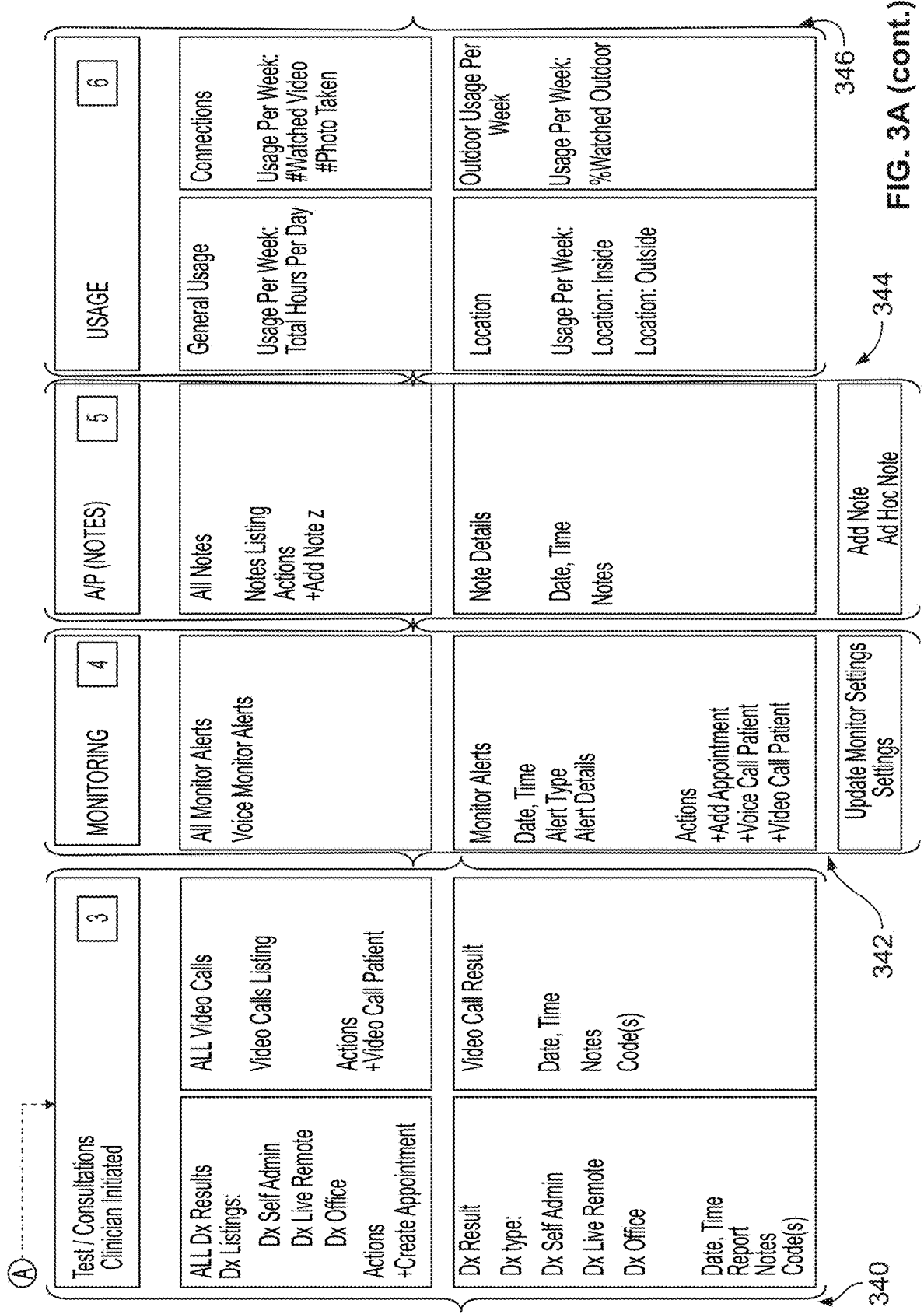

FIG. 3A is a block diagram illustrating a plurality of functional modules that, when executed, may be presented to a user of the HMVADD remote management system in one or more graphical user interfaces, in accordance with some embodiments of the present specification. In an embodiment, a user/clinician using the remote management system coupled with one or more HMVADDs is presented with a plurality of graphical user interfaces on at least one display system coupled to the central server or a web portal, which is any computing device coupled to the central server, configured to receive data from the central server, configured to send data to the central server, and configured to present portions of the data via one or more graphical user interfaces.

In an embodiment, one or more of the graphical user interfaces displays a prompt for a user to log in at 302 or get help for logging in at 303. It should be appreciated that all functional module descriptions provided herein presume the data being presented or requested are done through the one or more graphical user interfaces. If the user is accessing the remote management system for the first time, the one or more graphical user interfaces presents the user with options for on-boarding to the system at 305 by inputting predefined personal information and creating a username and password for the system. Upon logging in to the remote management system the user is presented with a home screen at 304 which enables the user to select one or more options/modules for obtaining patient related information or performing patient related tasks at 306, obtaining information regarding referrals at 308, obtaining calendar related information at 310, learning more about the remote management system at 312, contacting sales personnel at 314, changing system settings at 316, and signing out of the system at 318. Upon selecting the option for changing system settings, the user is presented with an option for modifying his/her password at 320 or uploading a picture at 322. Upon selecting the option for learning more about the remote management system, the user is presented with an option for viewing pre-recorded system tutorial videos at 324. Upon selecting the option for obtaining calendar related information, the user is presented with an option for viewing one or more records of patient appointments at 326. Upon selecting the option for obtaining information regarding referrals, the user is presented with an option for viewing one or more records of patient referrals at 328.

Upon selecting the option for obtaining patient related information or performing patient related tasks, the user is directed to a patient hub at 330. Within the patient hub the user may access a summary of predefined patient status data at 332. In embodiments, said patient status data may comprise a patient device status-being 'online' or 'offline'; patient upcoming appointments including dates and times of the appointments; patient latest submitted intakes including dates and times of the intakes; latest submitted self-administered patient diagnosis including dates and times of the diagnosis; latest monitor alerts corresponding to a patient including dates and times of the alerts; and high level patient usage metrics. These metrics may include, but is not limited to: information regarding the duration or amount of time the device was worn per day; information regarding the duration the device was kept on once it was worn; the most common time during which the device is worn; and the modes in which the device was operated, including information about the content that was viewed, use in high/low vision environments, high low contrast, indoor/outdoor use, text use, television use, and near or far recognition. This information can be displayed in terms of mean, median, and/or most common scenario and values can be presented in relationship to each other, such as, for example, preferred vision mode in morning vs evening. The metrics may also include information regarding patient interaction with the device, including response time to requests for meetings and self-administered tests and execution of these tests in terms of duration and accuracy.

The patient hub 330 also comprises an option for performing ad hoc actions at 334. In an embodiment the ad hoc actions are clinician-initiated actions not logically tied with an appointment, such actions being active only when a patient's HMVADD is coupled with and online with the central server. In an embodiment, said ad hoc actions comprise engaging in a video call to the patient to perform an ad-hoc consultation; recording or viewing data indicative of video call patient consultation sessions along with corresponding date, time, and/or note data, mirroring the patient's HMVADD screen for viewing the patient's display during an ad-hoc consultation, and/or screen mirroring of the patient's consultations including date, time and/or duration of the consultation.

Figure 3B:
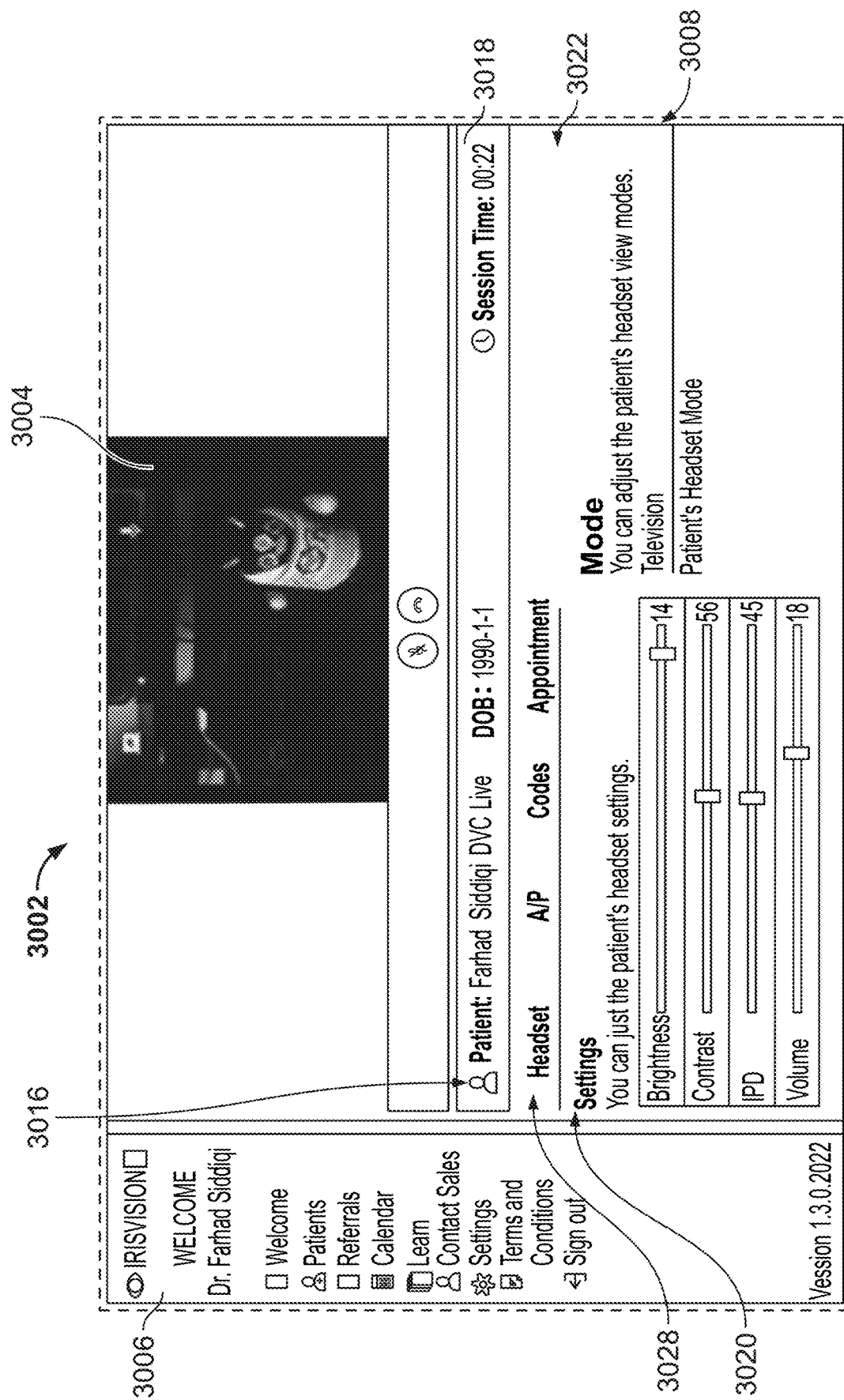
FIG. 3B illustrates a screen shot of a patient's HMVADD screen mirrored by a clinician, in accordance with an embodiment of the present specification.

FIG. 3B illustrates a screen shot of a patient's HMVADD screen mirrored by a clinician, in accordance with an embodiment of the present specification. FIG. 3C is a diagram of the screen shot shown in FIG. 3B, in accordance with an embodiment of the present specification. Referring to FIGS. 3B, and 3C section 3004 of screen 3002 displays a view of what the patient is viewing through his/her HMVADD. A section 3006 displays a menu for accessing different modules/options of the HMVADD remote management system. Section 3008 comprises controls that may be used by the clinician to monitor/modify the patient's vision related parameters, thereby altering the image being displayed in section 3004. Section 3004, in an embodiment, comprises a section 3010 for displaying a message informing the clinician that he/she is on mute. By clicking on icon 3012 displayed in section 3004, the clinician may mute/unmute his/her audio system. Icon 3014 is provided in proximity to icon 3012 for enabling the clinician to end the screen mirroring option when desired. A section 3016 in the screen section 3004 displays patient details such as patient name, date of birth, and identification number. A timer 3018, displaying how much time has elapsed since the beginning of the screen mirroring session between the patient and the clinician, is also displayed in section 3016.

Referring to FIGS. 3B and 3C, section 3008 comprises a section 3020 for providing controls to the clinician and/or the patient to control settings such as brightness, contrast, interpupillary distance (IPD), volume, field of view and magnification of the display on the patients HMVADD. A value of each of said control parameters may be altered between predefined high and low values by moving a slider to obtain a desired value. Section 3008 also comprises a section 3022 enabling the clinician and/or the patient to change a mode of the HMVADD. In embodiments, the clinician/patient may be allowed to choose from a plurality of predefined HMVADD modes by selecting a desired mode form a drop-down list. The clinician may allow the patient to change display settings or mode by checking a checkbox 3024, 3026 in sections 3020 and 3022 respectively. A tab 3028 positioned above section 3008 allows the clinician to navigate to sections/modules providing information regarding notes, codes and appointments corresponding to the patient; which information is then displayed in section 3022. In embodiments, codes include diagnostic codes, such as but not limited to an ICD code that specifies medical conditions. A common classification is ICD-10, which includes codes for diseases, symptoms, abnormal findings, complaints as well as social circumstances and external causes of injury or diseases. In addition, current procedural terminology (CPT) codes or service codes, which represent a universal system for identifying medical procedures, can be used. Each procedure is assigned a unique five digit code that can also be used to communicate to health insurance companies what type of care was provided.

Figure 8:
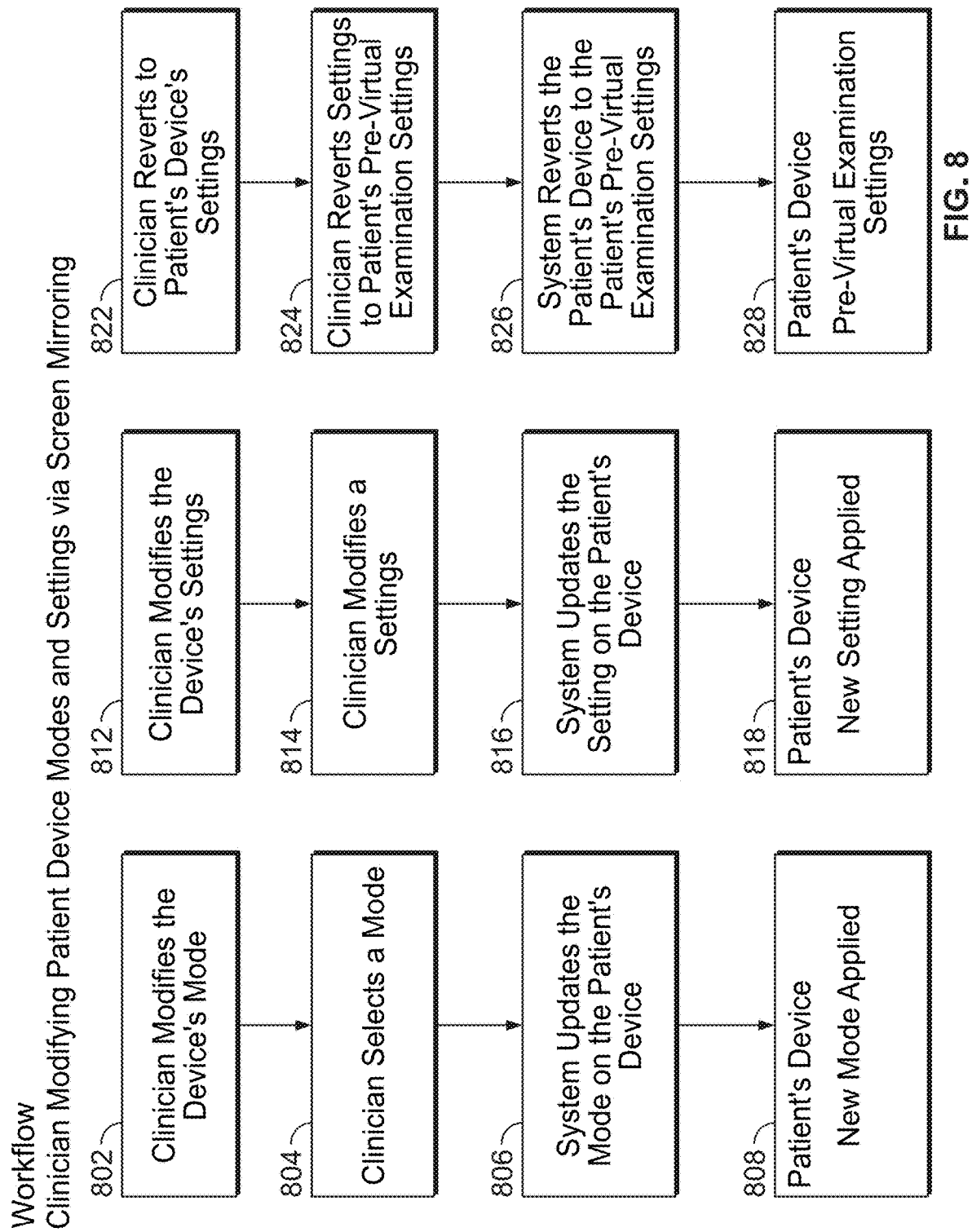
FIG. 8 is a set of exemplary flow diagrams showing how a clinician may modify patient device modes and settings using screen mirroring/sharing in some embodiments of the present specification.

In embodiments, as shown in FIG. 8, the clinician may modify patient device modes and settings using screen mirroring/sharing. Workflow 802 shows how a clinician modifies the device's mode using screen mirroring/sharing. As shown in workflow 802, in step 804, a clinician selects a mode. Then, in step 806, the system updates the mode on the patient's device. In step 808, the patient device announces, via a GUI, that a new mode is applied. Workflow 812 shows how a clinician modifies the device's settings using screen mirroring/sharing. As shown in workflow 812, in step 814, a clinician modifies at least one setting. Then, in step 816, the system updates the setting on the patient's device. In step 818, the patient device announces, via a GUI, that a new setting is applied. Workflow 822 shows how a clinician reverts to a patient's device settings using screen mirroring/sharing. As shown in workflow 822, in step 824, a clinician reverts settings back to a patient's pre-virtual examination settings. Then, in step 826, the system reverts the patient's device to the patient's pre-virtual examination settings. In step 828, the patient device announces, via a GUI, that the device has been reverted to pre-virtual examination settings.

Referring back to FIG. 3A, upon accessing the patient hub at 330, the user may access or take actions corresponding to a plurality of patient appointment related information/tasks such as managing patient appointments at 336. In an embodiment, the user may add an appointment for scheduling a patient-clinician consultation by adding an appointment type (which maybe self-administered, remote diagnosis, office consultation, or consultation via patient screen mirroring), appointment date and time, and any special instructions provided by the patient. The user may be allowed to make/view or cancel appointments. In an embodiment, the user may view all appointments including upcoming, past and requested (patient initiated) along with corresponding appointment details such as self-administered, remote diagnosis via video call, office consultation, or consultation via patient screen mirroring and the date and times of each appointment. In an embodiment, the user may be allowed to perform actions such as starting an upcoming appointment session or editing said appointment; rescheduling, cancelling, adding a note, running a live remote diagnosis session; and running an office diagnosis session corresponding to each upcoming or requested appointment.

Figure 3D:
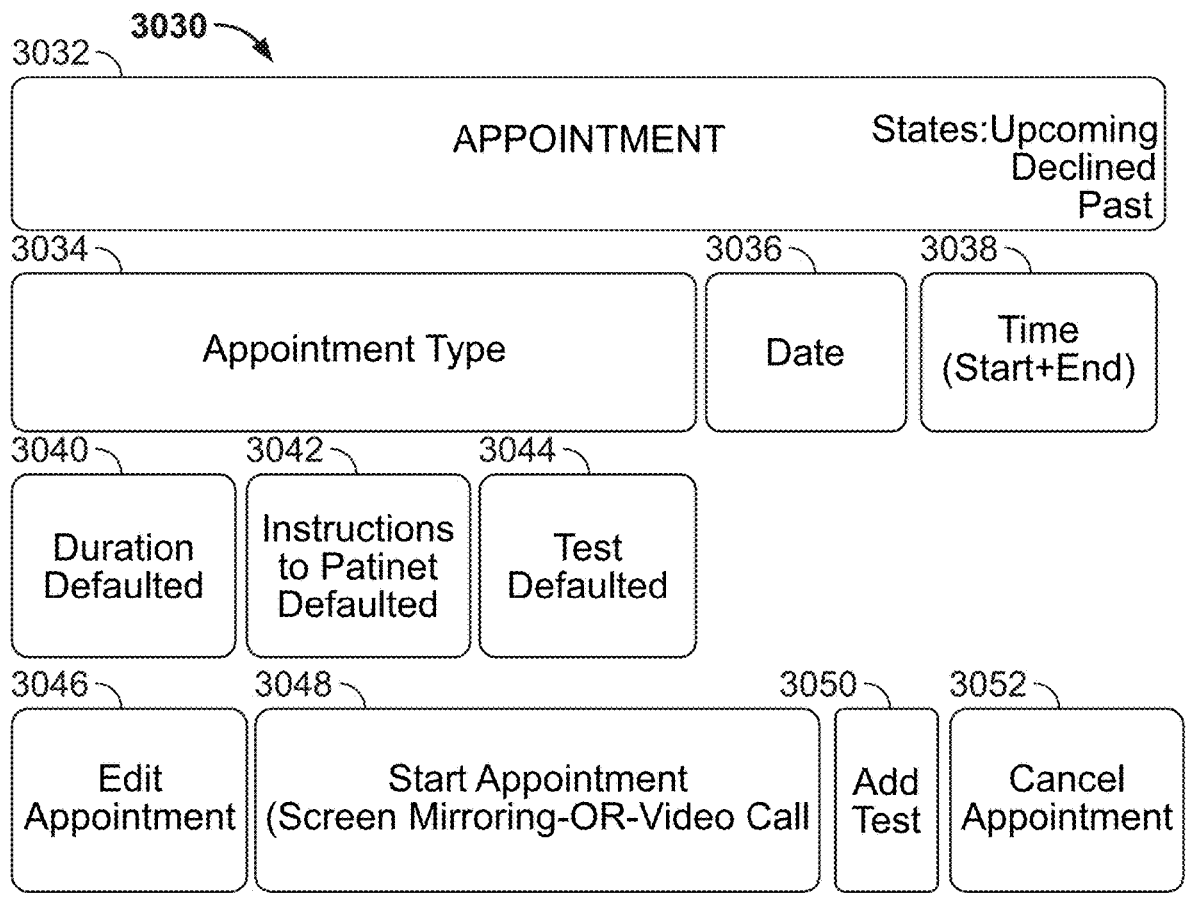
FIG. 3D is a modular diagram of the graphical user interface that is made available to a clinician for managing patient appointments, in accordance with an embodiment of the present specification.

FIG. 3D is a diagram of functional modules that, when executed, display one or more graphical user interfaces to a clinician for managing patient appointments, in accordance with an embodiment of the present specification. Module 3030 comprises a submodule 3032 directed to managing a patient appointment. The submodule 302 also conveys a status of the appointment which maybe upcoming, declined or past. A submodule 3034, when executed, provides information regarding the appointment 'type' which may be remote or in-person. In embodiments, an appointment 'type' is set to predefined default parameters. In an embodiment, an appointment may be a recurring one, for example set to reoccur every six months. Submodules 3036, 3038, when executed, show the appointment date and time respectively. Submodules 3040, 3042 and 3044, when executed, allow management of a duration, instructions to the patient, and tests conducted by the patient prior to the appointment respectively. The values of submodules 3040, 3042 and 3044 are set to predefined default values unless edited by the clinician. Submodule 3046, when executed, allows the clinician to edit the appointment parameters such as, but not limited to appointment date and time. Executing submodule 3048 causes the appointment to begin by causing a video call or screen mirroring of the patient's HMVADD to commence. Submodules 3050 and 3052 enable the clinician to add one or more tests required to be conducted with respect to the patient's vision and cancel the appointment respectively.

Figure 3E:
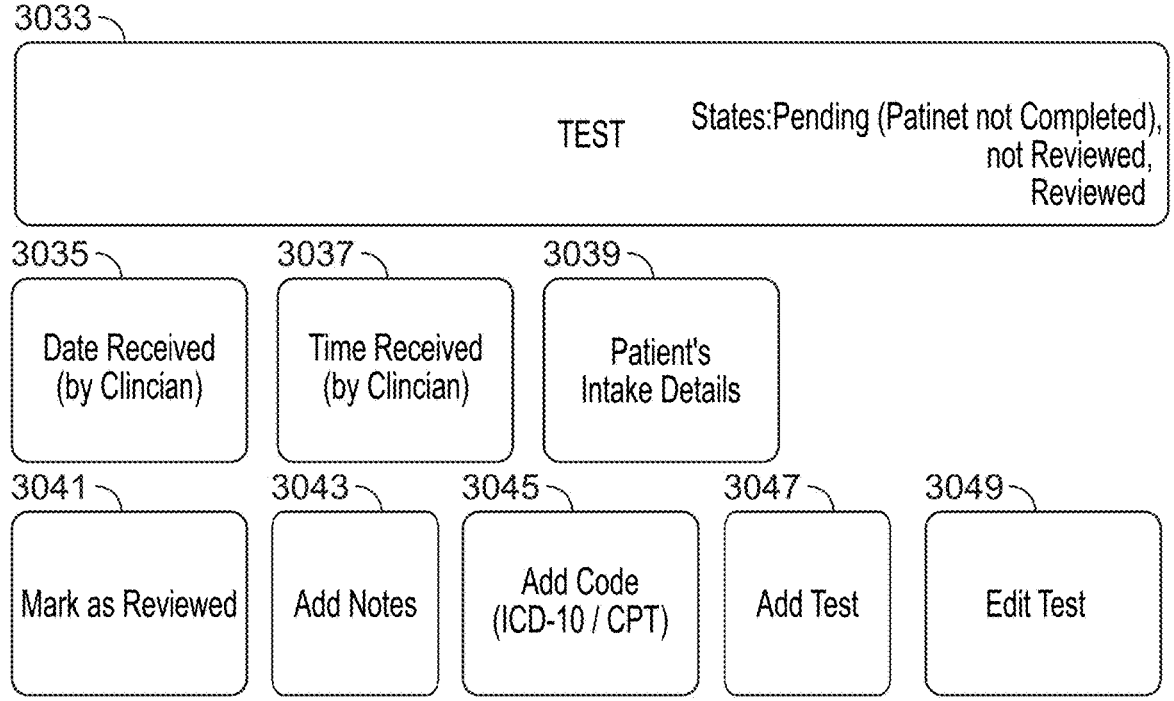
FIG. 3E is a modular diagram of the graphical user interface that is made available to a clinician for managing tests prescribed to the patient and the tests conducted remotely by the patient prior to an appointment with the clinician, in accordance with an embodiment of the present specification.

FIG. 3E is a diagram of functional modules that, when executed, display one or more graphical user interfaces to manage tests prescribed to the patient and the tests conducted remotely by the patient prior to an appointment with the clinician, in accordance with an embodiment of the present specification. Module 3031 comprises a submodule 3033 that, when executed, manages a patient's tests and displays corresponding tests results. The submodule 3033, when executed, conveys a status of the tests prescribed to the patient, wherein the status may be 'pending' if the patient has not completed the prescribed tests, 'reviewed' if the clinician has reviewed the patient's tests results, or 'not reviewed' if the clinician has reviewed the patient's tests results. Submodules 3035, 3037, when executed, provide information regarding a date and time on which the patient's intake specifying the conducted tests is received by the clinician. Executing submodule 3059 provides details of the patient intake, which, in some embodiments, is a standard intake form.

Submodule 3041, when executed, marks the patient intake as reviewed by a clinician. Submodules 3043 and 3045, when executed, enable the clinician to add notes and codes respectively corresponding to the patient intake. Submodules 3047 and 3049, when executed, enable the clinician to add and edit respectively, any vision tests that the patient has been prescribed to take.

Referring back to FIG. 3A, upon accessing the patient hub at 330, the user may access or take actions regarding patient intakes, patient surveys and/or activity inventories which may be patient-initiated or clinician-initiated, at 338. In an embodiment, the user may view all intake results including all associated dates, times, notes, reports, and codes if any, and/or request a patient intake. Upon viewing the patient intake results the user may be allowed to add an appointment, make a video/voice call to a patient or submit predefined alerts which are shown labeled as 'happy alerts' (which may be notes telling the patient that he/she has taken a required action/test) in FIG. 3A, along with the date, time, and/or notes associated with said alerts. In some embodiments, the predefined alerts may include alerts for appointments with a clinician either in office or remotely; alerts a trigger or reminder to self-administer a test; alerts indicating an overdue test; alerts for an overdue test; alerts for results available for viewing by patient; and/or a general alert indicating the availability of a new message from clinician to patient or vice versa. In embodiments, alerts can also be used to motivate a user to participate and/or provide rewards, such as virtual rewards, a motivational technique also referred to as gamification. In embodiments, the alerts may include notifications for the availability of rewards for frequent or regular use and/or corresponding warnings or checkup alerts from missing use. In embodiments, the alerts and rewards scheme may provide positive reinforcement for improved behavior, such as a completed prescribed vision test or a complete survey. In an embodiment, the user may view all active inventory results which are clinician initiated including all associated dates, times, notes, reports, and codes if any, and/or request a patient activity inventory. In an embodiment, the user may view all patient surveys which are clinician initiated including all associated dates, times, and survey details, and/or request a patient survey.

Figure 3F:
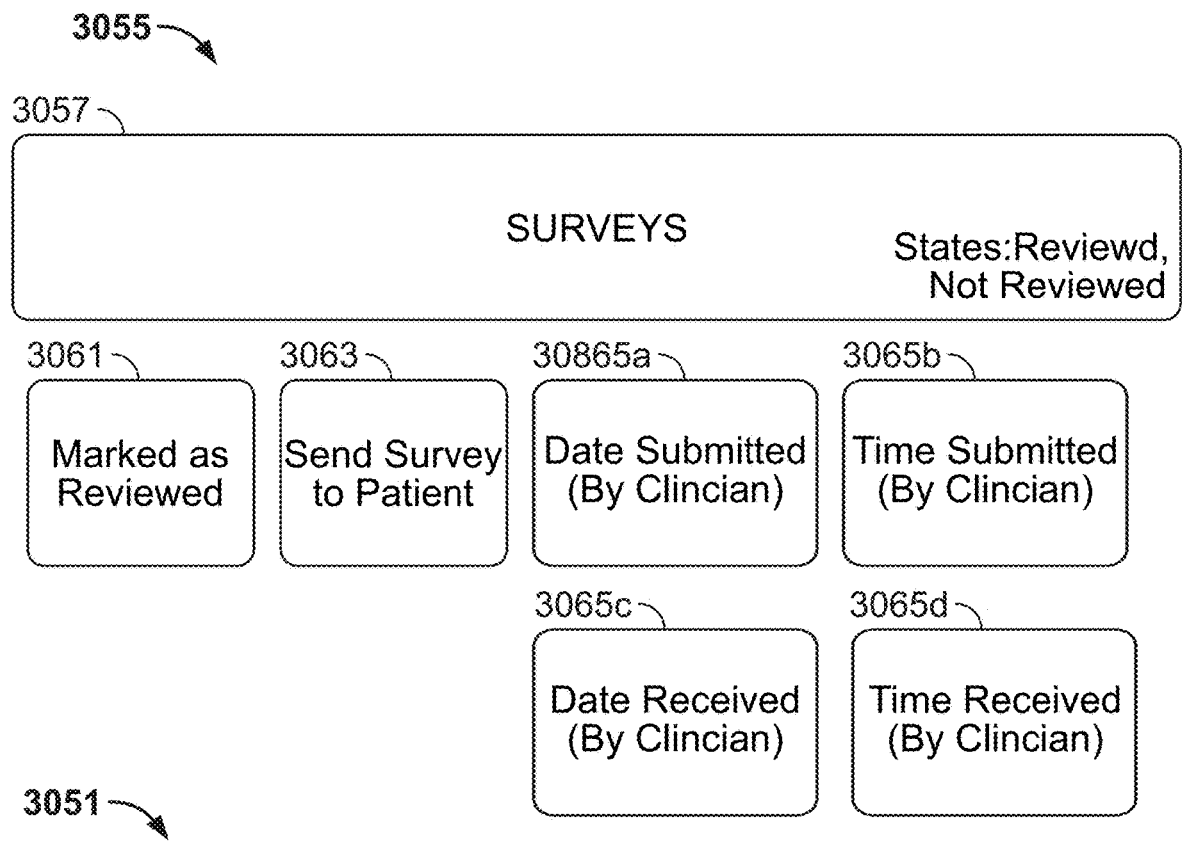
FIG. 3F is a modular diagram of the graphical user interface that is made available to a clinician for managing patient surveys, in accordance with an embodiment of the present specification.
Figure 7:
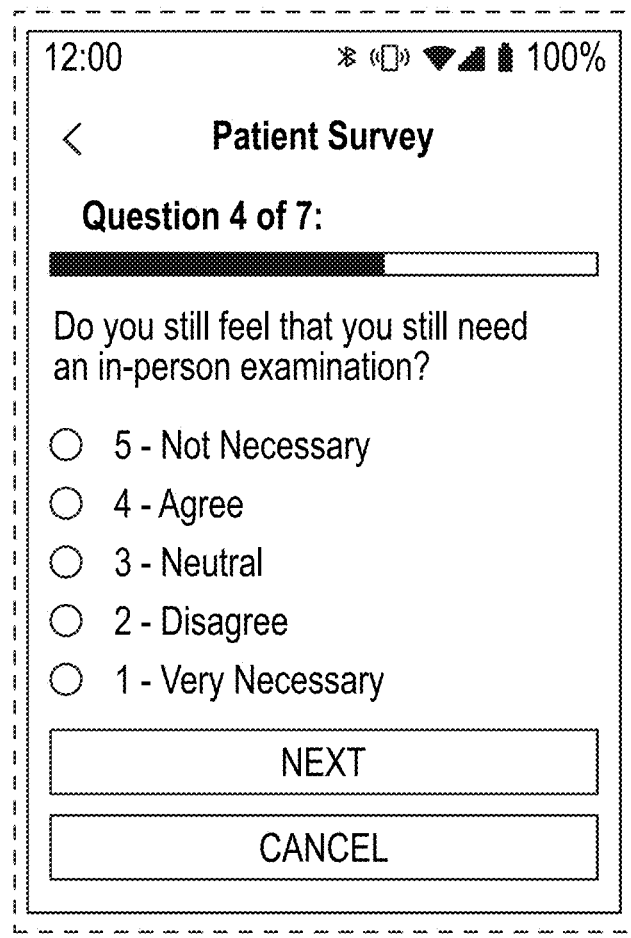
FIG. 7 is a set of exemplary graphical user interfaces (GUIs) illustrating a survey that may be provided to a patient.

FIG. 3F is a diagram of functional modules that, when executed, display one or more graphical user interfaces to manage patient surveys, in accordance with an embodiment of the present specification. Module 3055, when executed, may be used by a clinician or an administrator of the remote management system to manage a survey taken by a patient, and further comprises submodule 3057 that, when executed, depicts, or assists in the management of, a patient survey. In some embodiment, the patient survey may include a complaint, for example, a reason why a patient is seeing a physician. FIG. 7 is a set of exemplary GUIs 700 illustrating a survey that may be provided to a patient. Referring back to FIG. 3F, executing submodule 3061 causes the patient survey to be marked as reviewed. Executing submodule 3063 causes a survey to be sent to a patient registered in the system by using the patient's pre-recorded contact information. Executing submodules 3065*a* and 3065*b* enable a user to view the date and time respectively that the survey was sent to the patient; and executing submodules 3065c and 3065d enable the user to view the date and time respectively that the survey was received from the patient.

Figure 3G:
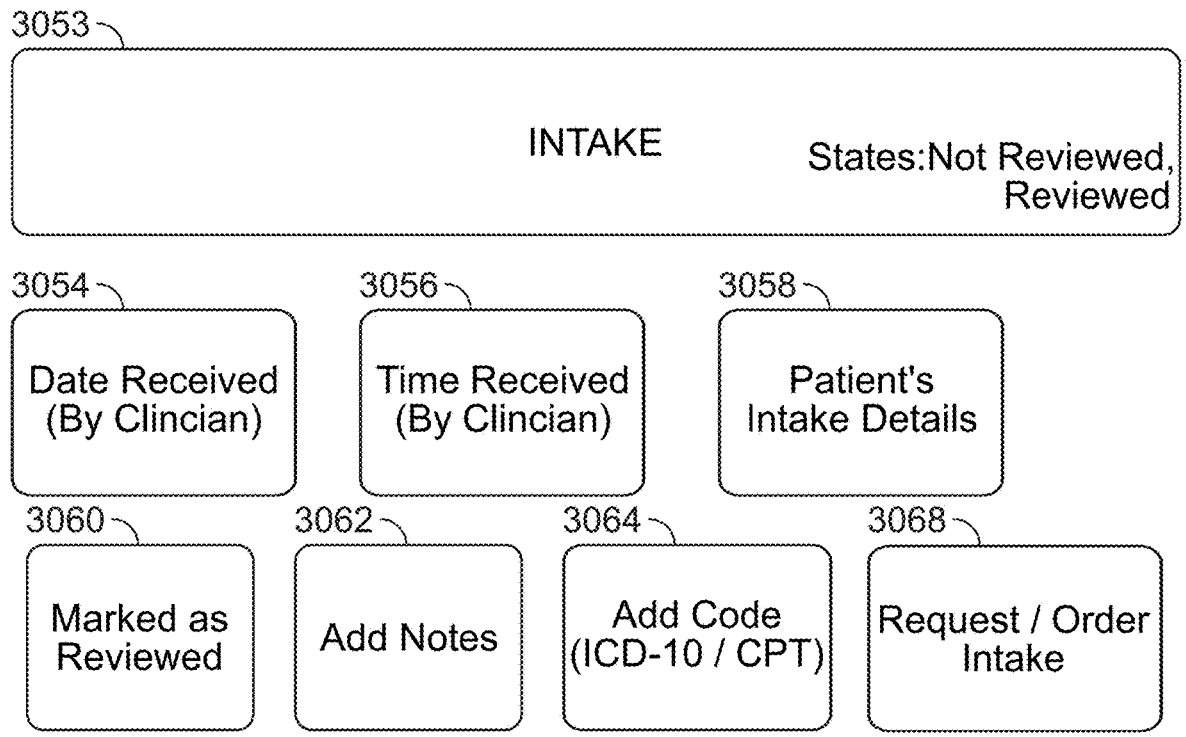
FIG. 3G is a modular diagram of the graphical user interface that is made available to a clinician for managing patient intakes, in accordance with an embodiment of the present specification.

FIG. 3G is a diagram of functional modules that, when executed, display one or more graphical user interfaces to manage patient intakes, in accordance with an embodiment of the present specification. Module 3051, when executed, may be used to manage an intake submitted by a patient for a clinician's review, and comprises submodule 3053 that, when executed, depicts an interface that may be used to manage a patient intake. Submodules 3054, 3056, when executed, provide information regarding a date and time on which the patient intake is received by the clinician. Executing submodule 3058 provides details of the patient intake, which comprise notes, reports, and codes, if any. Executing submodule 3060 marks the patient intake as reviewed by a clinician. Executing submodule 3062 and 3064 enable the clinician to add notes and codes respectively corresponding to the patient intake and executing submodule 3066 enables the clinician to request/order a patient intake. In embodiments, various notes, reports, and codes, if any, may be managed. In embodiments, notes include observations on sessions or patient complaints (which refer to the reason why the patient is seeing the physician).

Referring back to FIG. 3A, upon accessing the patient hub at 330, the user may access or take clinician-initiated actions regarding patient tests and consultations, at 340. In embodiments, the clinician may be allowed to view and/or edit all patient diagnosis results including any self-administered diagnostic tests and clinician-provided diagnostic tests whether remotely or in the clinician's office. The clinician may view and/or edit all diagnostic results including date, time, notes, codes and/or reports corresponding to each diagnostic test and may be allowed to make patient appointments based on the diagnostic results. In some embodiments, results of one or more diagnostic tests, conducted by the patient remotely from the clinician's office, are automatically transmitted to the clinician's computing device at predefined intervals. The clinician, by executing module 340, may view all recorded video call listing and data along with corresponding date, time notes and codes and may also be enabled to make video calls to patients via module/option 340.

Figure 9:
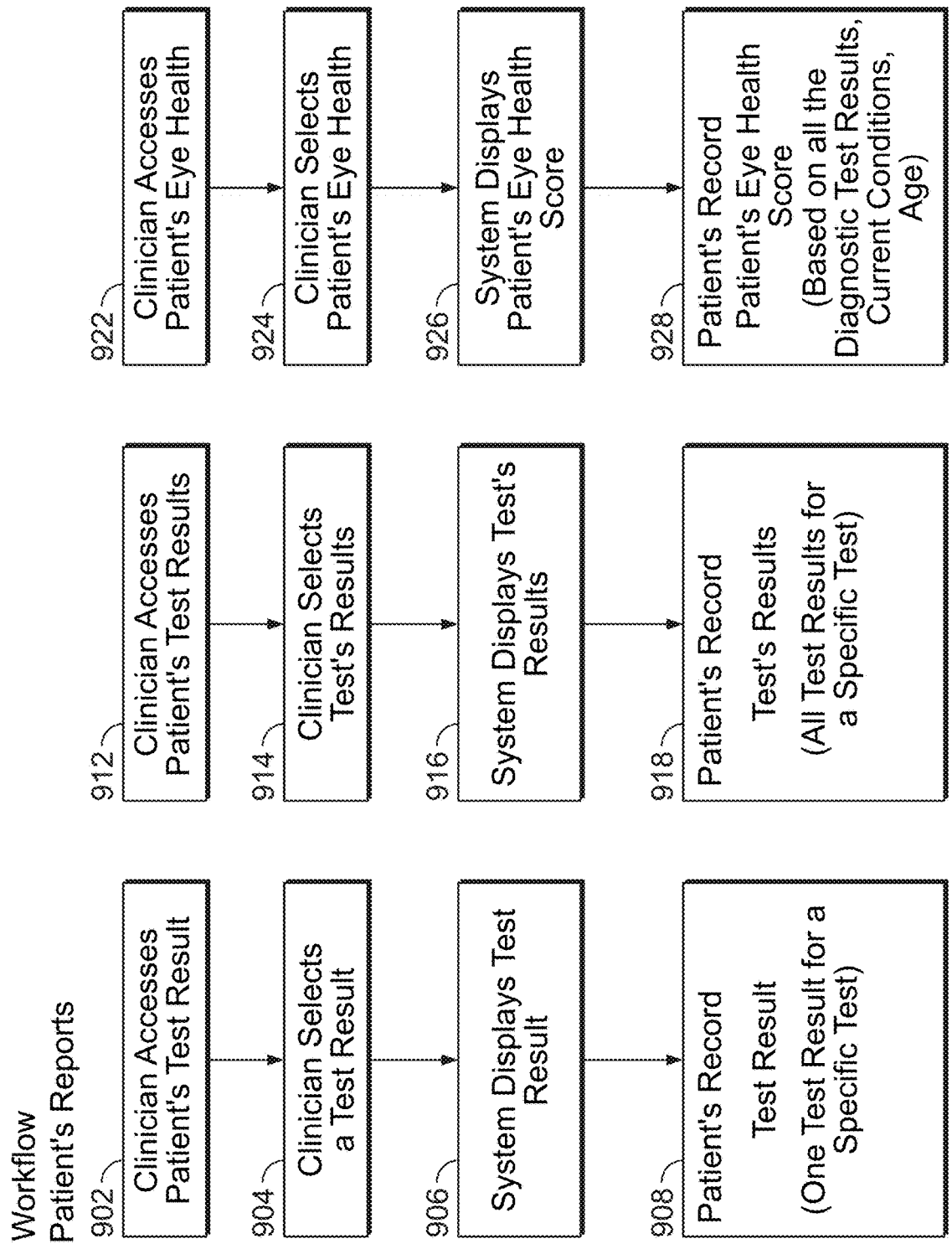
FIG. 9 is a set of exemplary flow diagrams showing how a clinician may access patient reports in an embodiment of the present specification.

In embodiments, the clinician may access patient reports in various manners. In an embodiment, a diagnostic test report per test result may be accessed. In another embodiment, a diagnostic test report collective result may be accessed, wherein the collective result includes all test results for a diagnostic test taken. In another embodiment, an overall eye health score based on all diagnostic test results may be accessed, which may include current conditions or age. FIG. 9 is a set of exemplary flow diagrams showing how a clinician may access patient reports in an embodiment of the present specification. Referring now to FIG. 9, workflow 902 shows how a clinician accesses a patient's test result. As shown in workflow 902, in step 904, a clinician selects a test result. Then, in step 906, the system displays the selected test result. In step 908, the device provides an indication that the patient's record is showing one test result for a specific test. Workflow 912 shows how a clinician accesses an aggregate of a patient's test results. As shown in workflow 912, in step 914, a clinician selects at least two test results. Then, in step 916, the system displays the test results. In step 918, the device provides an indication that an aggregate of test results, all test results for a specific test, are being shown from the patient record. Workflow 922 shows how a clinician can access a patient's eye health indicator. As shown in workflow 922, in step 924, a clinician selects a button to access a patient's eye health indicator. In step 926, the system displays a patient's eye health score. In step 928, the device announces, via a GUI, that what is being displayed is a patient's eye health score which is based on all diagnostic test results, current conditions, and age from the patient's record.

Referring back to FIG. 3A, upon accessing the patient hub at 330, the user may manage alerts displayed via a monitor of the remote management system, at 342. In embodiments, the user may view voice monitor alerts and corresponding data such as alert date, time and details and may be allowed to edit alert settings. In an embodiment, the user may be enabled to make patient appointments and voice/video calls to a patient via module/option 342.

Upon accessing the patient hub at 330, the user may manage patient notes, at 344. In embodiments, the user may view all patient notes data including date, time and note details; and add patient notes if needed. The user may be enabled to add ad-hoc patient notes via module/option 344.

FIG. 3H is a diagram of functional modules that, when executed, display one or more graphical user interfaces to manage patient notes, in accordance with an embodiment of the present specification. In embodiments, all patient notes from different modules of the HMVADD remote management system of the present specification are aggregated and made available for a clinician's review via an assessment/plan (A/P) module of the system. A clinician may access the A/P module by executing submodule 3072 of module 3070. Executing submodule 3074 enables the clinician to view all patient notes comprising notes corresponding to patient tests, video calls, screen mirror sessions and patient intakes. Executing submodules 3076 and 3078 enable the clinician to add and edit respectively, ad-hoc notes to a patient's record. Executing submodule 3080 enables the clinician to add code to the patient's record. Executing submodules 3082, 3084 provide information regarding a date and time when a note is added or edited by a clinician.

FIG. 3I is a diagram of functional modules that, when executed, display one or more graphical user interfaces to manage patient codes, in accordance with an embodiment of the present specification. In embodiments, all patient codes from different modules of the HMVADD remote management system of the present specification are aggregated and made available for a clinician's review via a module 3081 and may be accessed by executing submodule 3083. A clinician may find any patient code via the module 3081 by executing submodule 3085 which, in an embodiment allows the clinician to enter a search parameter to obtain one or more desired patient codes.

FIG. 3J is a diagram of functional modules that, when executed, display one or more graphical user interfaces to make remote diagnoses of patients via video calls, in accordance with an embodiment of the present specification. Module 3086 comprises submodule 3087 that, when executed, generates an interface that may be used to conduct a video call session with a patient. In an embodiment, a clinician may be enabled to make a video call to a patient by executing submodule 3085. Executing submodules 3088, 3089 and 3090 enable the clinician to run any diagnosis tests on the patient, record patient notes and codes respectively, corresponding to the patient diagnosis during the video call session with the patient.

FIG. 3K is a diagram of functional modules that, when executed, display one or more graphical user interfaces to mirror a patient's HMVADD screen for viewing the patient's display during a consultation session, in accordance with an embodiment of the present specification. Module 3091 comprises submodule 3092 that, when executed, generates a graphical user interface which may be used to conduct a screen mirroring session with a patient. In an embodiment, a clinician may start or end a screen mirroring session with a patient by executing submodule 3093. Executing submodules 3094, 3095 and 3096 enable the clinician to run any diagnosis tests on the patient, record patient notes and codes respectively, corresponding to the patient diagnosis during the screen mirroring session with the patient.

Referring back to FIG. 3A, upon accessing the patient hub at 330, the user may monitor and/or manage patient and/or clinician usage of the HMVADD remote management system, at 346. The user may obtain details/statistics regarding the general use of the system including usage per week including videos watched and photos taken, usage (in hours) per day, and location of usage being indoor or out-door per week.

FIG. 3L is a diagram of functional modules that, when executed, display one or more graphical user interfaces to monitor and/or manage patient and/or clinician usage of the HMVADD remote management system, in accordance with an embodiment of the present specification. Module 30100 may be used by a clinician or an administrator of the remote management system to monitor/manage patient activity conducted on the HMVADD, and comprises submodule 30102 that, when executed, generates an interface which may be used to manage a patient activity inventory. Executing submodule 30104 causes a record of the patient activity to be marked as reviewed. Executing submodule 30106 causes the activity inventory to be sent to a corresponding patient registered in the system by using the patient's pre-recorded contact information. Executing submodules 301008a and 30108b enable a user to view the date and time respectively, that the activity inventory was sent to the patient and executing submodules 30108c and 30108d enable the user to view the date and time respectively, that the activity inventory was received from the patient.

In embodiments, the HMVADD remote management system of the present specification comprises an administrative module, diagnostic modules and a therapeutic module wherein each module refers to computer logic utilized to provide a desired functionality, service or operation by programming or controlling a general purpose processor. In embodiments, the administrative module provides a plurality of functional abilities to clinicians/patients such as, but not limited to calendar management and patient appointment scheduling; screen mirroring that enables a clinician to take a patient's view to allow for assistance and improved diagnostics, including the ability for the clinician to modify settings of the patient's device; obtaining screenshots, videos, or audio recordings to allow a user to capture what he/she is seeing via his/her HMVADD and to describe it for purposes of reporting a problem to a clinician; and obtaining notifications which direct messages from clinicians to patients. In embodiments, the administrative module provides a plurality of vision tests such as, but not limited to visual acuity test, contrast sensitivity test, vision distortion test, micro visual field test, and visual field test. In an embodiment, each diagnostic test is provided as a block of code which may be executed by the remote management system separately and individually to provide different combinations of diagnostic tests for clinicians/users. In embodiments, the therapeutic module enables clinicians to provide interactive training/therapy sessions to patients located remotely via the patients' HMVADDs.

On-Boarding and Initial Diagnosis Process

Figure 4A:
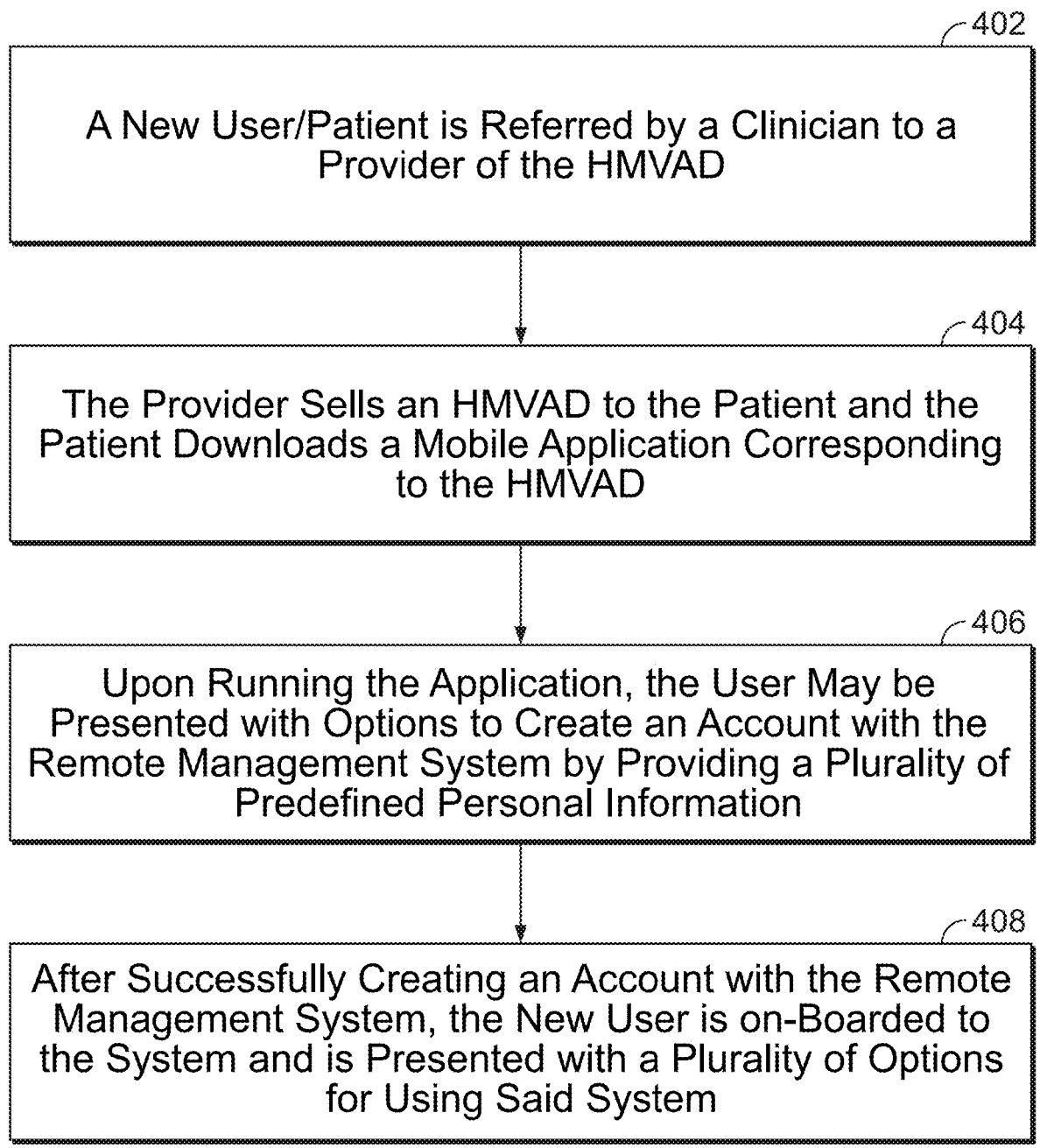
FIG. 4A is a flowchart illustrating a method by which a new user is onboarded to the HMVADD remote management system, in accordance with an embodiment of the present specification.

FIG. 4A is a flowchart illustrating a method by which a new user on boards the HMVADD remote management system, in accordance with an embodiment of the present specification. At step 402, in an embodiment, a new user/patient is referred by a clinician to a provider of the HMVADD. In embodiments, the clinician sends a welcome message to the patient containing a referral code which would allow the patient/new user to access the remote management system. At step 404, the provider sells an HMVADD to the patient and the patient downloads a mobile application corresponding to the HMVADD. FIG. 4B is a screen shot 452 of an exemplary welcome message sent to a new user of the remote management system, asking the user to download a corresponding mobile application, in accordance with an embodiment of the present specification. In embodiments, the mobile application may be provided customized for various mobile platform operating systems, and a corresponding version may be downloaded by the user based on the type of user's computing device. In an embodiment, once the user/patient turns on the HMVADD and connects the same to the Internet, and the clinician receives an approval from the patient to transfer patient data to the clinician and/or provider, the system provides a notification that allows for the clinician or provider to know that the HMVADD is on and is in a default state.

At step 406 upon running the application, the user may be presented with options to create an account with the remote management system by providing a plurality of predefined personal information. FIG. 4C is a screen shot 454 of an exemplary account creation screen presented to a new user, of the remote management system, in accordance with an embodiment of the present specification. In embodiments, the user may be presented with a welcome message as shown in section 456, may be presented with an option to connect with a clinician by providing a referral code as shown in section 458; and confirming the entered information as shown in section 460 of screenshot 454.

In an alternative embodiment, a setup may be facilitated to allow the use of the referral code that the clinician send to a patient, adding a patient into DVC Portal, as a "Referral". To convert the "Referral" into a registered "Patient" under DVC platform, the referred patient is contacted by support staff to validate and/or verify and/or qualify the patient. The credentials and referral code are shared with the patient via email that contains a customized link to download the application, containing information about the referring clinician. Once the patient downloads the application and log into for the first time, the patient is registered into the DVC platform as a "Patient".

FIG. 4D is a screen shot 462 of an exemplary account information confirmation screen presented to a new user, of the remote management system, in accordance with an embodiment of the present specification.

At step 408, after successfully creating an account with the remote management system, the new user is on-boarded to the system and is presented with a plurality of options for using said system, in accordance with an embodiment of the present specification. FIG. 4E is a screen shot 464 of an exemplary onboard screen presented to a new user, of the remote management system, in accordance with an embodiment of the present specification. The user is presented with options to tour the system, to see the system features, learn how to use the system and to watch video tutorials to learn the working of the system, as shown in section 466 of the screenshot 464. The user may be presented with an option to skip the system tour, as shown on screen shot 464 and proceed to a home screen which presents the user with a plurality of content and action options. In an embodiment, upon successful account creation the user is required to log in the system and is presented with the plurality of options/modules shown in FIG. 3A.

Figure 5:
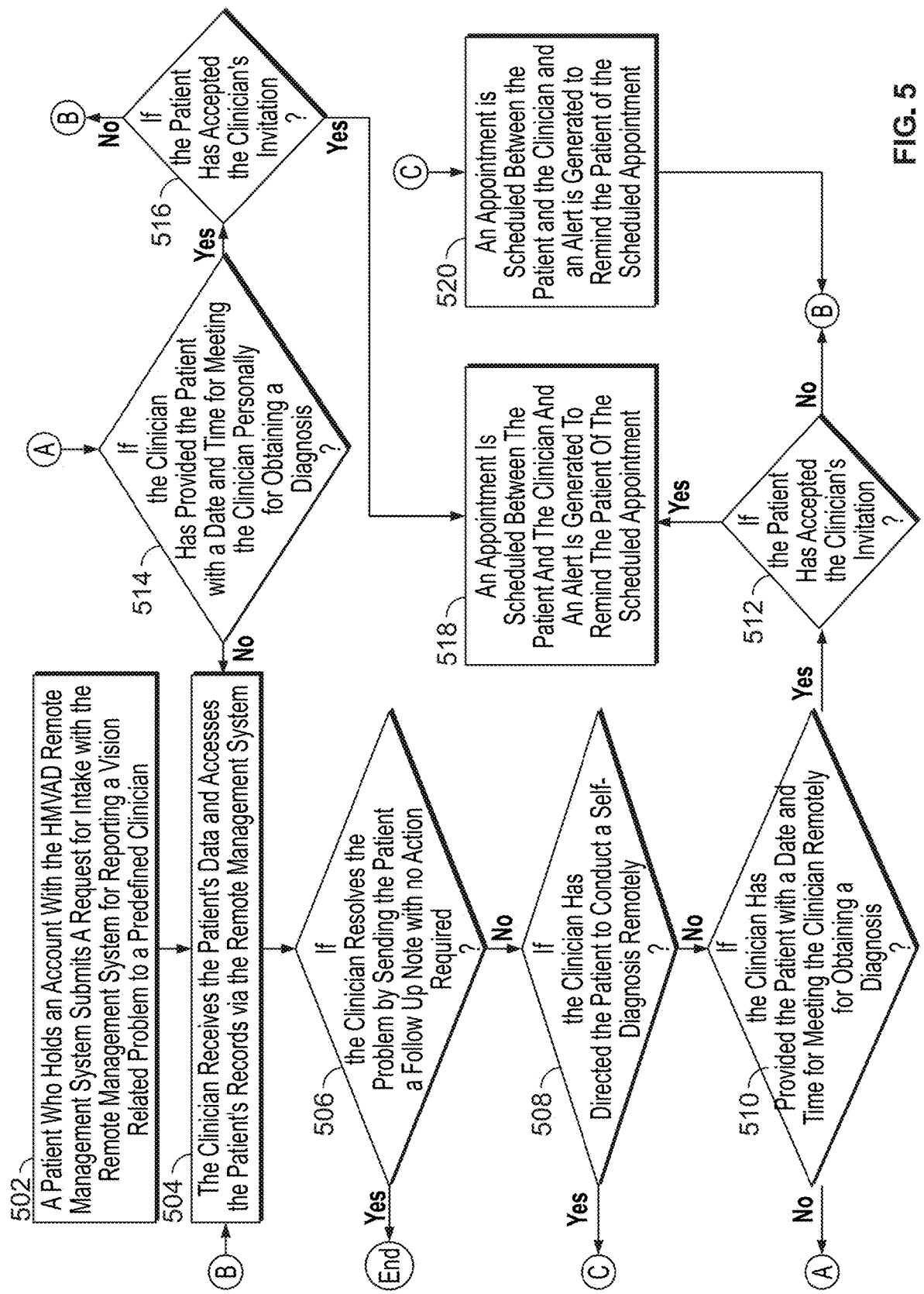
FIG. 5 is a flowchart illustrating a method by which a new user may obtain a diagnosis from a clinician by using the HMVADD remote management system, in accordance with an embodiment of the present specification.

FIG. 5 is a flowchart illustrating a method by which a new user may obtain a diagnosis from a clinician by using the HMVADD remote management system, in accordance with an embodiment of the present specification. At step 502, a patient who holds an account (is an on-boarded user as per the process described above) with the HMVADD remote management system, submits a request for intake with the remote management system for reporting a vison related problem to a predefined clinician. In an embodiment, the user may submit said report via a user interface coupled with a central server of the system, for reporting a problem with the user's vision. At step 504, the clinician receives the patient's request and accesses the patient's records via the remote management system. In embodiments, the patient's records comprise one or more vision reports made by a clinician comprising notes and codes by the clinician. In embodiments, a diagnosis plan for the patient is determined by the clinician based on said reports of the patient. At step 506 it is determined if the clinician resolves the problem by sending the patient a follow up note with no action required. In an embodiment, the patient may be sent a predefined 'happy alert' which may be a note applauding the patient on having taken a required action/test and any further action which may be required.

At step 508 if it is determined that the clinician has not resolved the problem, it is determined if the clinician has directed the patient to conduct a self-diagnosis remotely. If it is determined that the clinician has not directed the patient to conduct a self-diagnosis remotely, then at step 510 it is determined if the clinician has provided the patient with a date and time for meeting the clinician remotely for obtaining a diagnosis. If it is determined that the clinician has provided the patient with a date and time for meeting the clinician remotely for obtaining a diagnosis, then at step 512 it is determined if the patient has accepted the clinician's invitation. In an embodiment, the clinician may provide the client with the date and time for remote diagnosis via a calendar application invite of the remote management system wherein the patient may accept or reject the invite, also via said application. If it is determined that the clinician has not provided the patient with a date and time for meeting the clinician remotely for obtaining a diagnosis, then at step 514 it is determined if the clinician has provided the patient with a date and time for meeting the clinician personally for obtaining a diagnosis. If it is determined that the clinician has provided the patient with a date and time for meeting the clinician personally for obtaining a diagnosis at the clinician's office/clinic, then at step 516 it is determined if the patient has accepted the clinician's invitation. In an embodiment, the clinician may provide the client with the date and time for in-office diagnosis via a calendar application invite of the remote management system wherein the patient may accept or reject the invite, also via said application.

If the patient rejects the invite at step 512, 516, the clinician may process the patient's intake request again at steps 504 and provide another calendar invite if required. If the patient accepts the clinician's invite at steps 512, 516 an appointment is scheduled between the patient and the clinician and an alert is generated to remind the patient of the scheduled appointment, at step 518. If at step 508 it is determined that the clinician has directed the patient to conduct a self-diagnosis remotely, the patient conducts a self-diagnosis and submits a report of the same to the clinician at step 520.

On-Going Monitoring

In an embodiment, the remote management system of the present specification provides on-going monitoring of vision related problems of a patient by a clinician. In cases where a clinician determines that a patient suffers from one or more vision issues/condition that require one or more pre-defined tests to be conducted continually or at predefined time periods over a specified period of time, a continued/on-going patient monitoring is required. In various embodiments, the type of tests to be conducted and the frequency of said tests is dependent on a patient's condition as determined by a clinician by using the remote management system.

Preferably, the central server 204 comprises, or is coupled to, a database or other data structure that stores a plurality of vision conditions, such as diabetic retinopathy, dry macular degeneration, wet macular degeneration, primary open-angle glaucoma, cataract, dry eye, poor visual acuity, color blindness, amblyopia, and/or strabismus, in relation to a default testing protocol, where the testing protocol comprises a specific type of diagnostic tests, such as visual acuity, vision function, contrast sensitivity, and/or distortion testing, available to be administered via each of the HMVADDs and an associated frequency of testing, such as once a week, once a month, or once every plurality of months.

Figure 6:
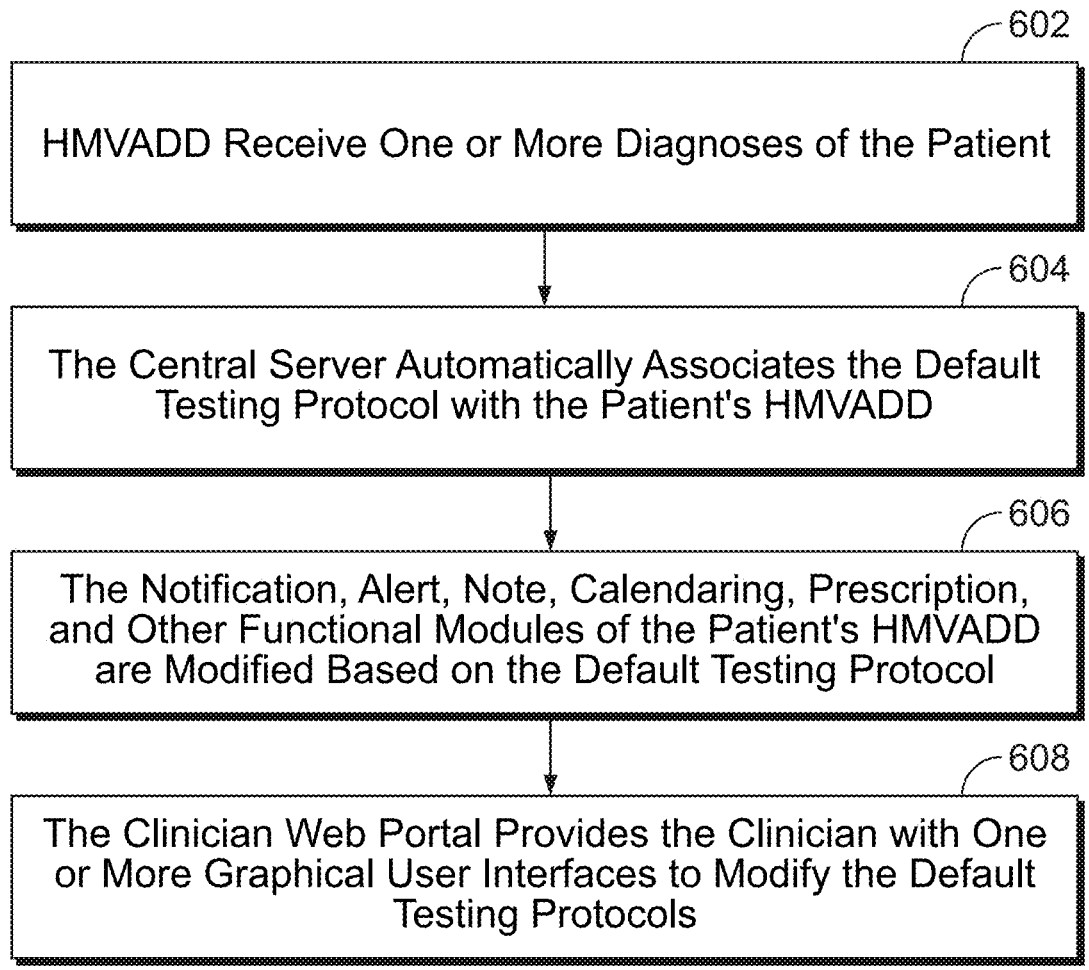
FIG. 6 is a flowchart illustrating a method by which the remote management system of the present specification provides on-going monitoring of vision related problems of a patient by a clinician.

FIG. 6 is a flowchart illustrating a method by which the remote management system of the present specification provides on-going monitoring of vision related problems of a patient by a clinician. At step 602, the HMVADD receives one or more diagnoses of the patient indicating that the patient suffers from one or more of the vision conditions. At step 604, the central server 204 automatically associates the default testing protocol (including each of the diagnostic tests and frequency of execution) with the patient's HMVADD. At step 606, the aforementioned notification, alert, note, calendaring, prescription, and other functional modules of the patient's HMVADD are modified based on the default testing protocol, thereby providing the patient with a clear testing framework. At step 608, the clinician web portal 206 provides the clinician with one or more graphical user interfaces to modify the default testing protocols, including by changing the type or number of tests and/or increasing or decreasing the frequency of executing each of the diagnostic tests.

For example, in an embodiment, for a patient suffering from diabetic retinopathy, the HMVADD enables a clinician to establish a testing protocol which defines a particular set of tests. Tests that may be required along with their frequency are as follows:

Visual Acuity (VA) testing once per month if the patient does not suffer from any macular disease
VA once per week if the patient suffers from macular edema
Contrast sensitivity once per month
Distortion testing once per week, if DME is present, otherwise the test may be conducted once a month In another example, for a patient suffering from dry macular degeneration (AMD), the tests that may be required along with their frequency are as follows:

VA and contrast sensitivity once per week
Distortion tracking twice per week
Microvisual field testing as advised by a clinician As another example, for a patient suffering from wet macular degeneration (AMD), continued patient monitoring is provided, and patients are required to visit the clinician at least once in two months for receiving prescribed medication.

As another example, for a patient suffering from primary open-angle glaucoma (POAG) or ocular hypertension, the tests that may be required along with their frequency are as follows:
VA testing once a week
Vision Function test once a week As another example, for a patient suffering from cataracts, the tests that may be required along with their frequency are as follows:
VA testing once every two months
Color testing once every two months
Distortion testing once every two months As another example, for a patient suffering from dry eye, the tests that may be required along with their frequency are as follows:
VA testing once every two months.
Color testing once every two months.
In an embodiment, the tests are conducted by using the HMVADD as said device creates a moisture chamber around a wearer/patient's eye which may help in improving the health of the patient's ocular surface once the patient has been wearing the device for 20-30 minutes.

In various embodiments, once a clinician completes a diagnosis of a patient, the HMVADD remote management system may be used to create a customized default schedule of tests including a frequency of conducting each test corresponding to the patient diagnosis. In an embodiment, the system presents a user/clinician with a graphical user interface (GUI) for managing/modifying the tests prescribed for a patient. An exemplary set of functional modules for managing a patient's tests is shown in FIG. 3E.

In an embodiment, if one or more results of the tests conducted corresponding to a patient diagnosis, indicate a condition change in the patient, the remote management system may perform one or more of the following actions:
Automatically adjust the type of test(s) to account for the change;
Automatically adjust the frequency of tests to account for the change;
Generate a notification to alert the clinician of a change of condition;
Recognize a pattern based on the tests to determine a potential new or modified diagnosis;
Notify the patient to submit an intake and/or schedule an appointment;
Prompt the patient to input additional data or take additional tests, including environmental test to determine light exposure in his/her surroundings; and
Prescribe specific therapeutic tests via the HMVADD which may address, treat, or mitigate the patient's visual condition or impairment. For example, for a patient suffering from amblyopia, the HMVADD remote management system may be used for visual rehabilitation. For a patient suffering from strabismus, the present HMVADD remote management system may be used to help with conditions where one of the patient's eye is not aligned with the other, or where the patient's eyes do not work well together and have conditions such as, but not limited to exotropia, and convergence insufficiency.

The above examples are merely illustrative of the many applications of the system of present specification. Although only a few embodiments of the present invention have been described herein, it should be understood that the present invention might be embodied in many other specific forms without departing from the spirit or scope of the invention. Therefore, the present examples and embodiments are to be considered as illustrative and not restrictive, and the invention may be modified within the scope of the appended claims.

We claim:

1. A system for assessing vision of one or more patients, the system comprising:
   at least one head mounted vision assessment devices;
   at least one computing device adapted to be used by a clinician;
   a server computer at least periodically communicatively coupled with the at least one head mounted vision assessment device and the at least one computing device, wherein the server computer comprises a processor and is coupled with a non-transient memory comprising programmatic instructions and wherein, when executed by the processor, the programmatic instructions:
   cause results of one or more diagnostic tests conducted by the one or more patients using the at least one head mounted vision assessment device to be transmitted to the at least one computing device;
   generates data representative of a mirror display, wherein the mirror display simulates at least a portion of a display associated with the at least one head mounted vision assessment device and causes said data representative of the mirror display to be presented on the at least one computing device to enable the clinician to monitor each of the one or more patients' fields of view;
   receive an assessment of each of the one or more patients, from the clinician, based on at least one of the results from the one or more diagnostic tests or the mirror display of the one or more patients' fields of view; and
   receive at least one of a prescription or an instruction to perform a therapy in order to treat one or more of the patients based on the assessment.

2. The system of claim 1, wherein the clinician's computing device is located remote to the location of the server computer and wherein at least some of the plurality of patient locations are located remote from each other.

3. The system of claim 1, wherein the processor is further programmed to execute the programmatic instructions to enable the patients and the clinician to remotely schedule consultation appointments, modify scheduled appointments, and/or cancel scheduled appointments.

4. The system of claim 1 wherein the processor is further programmed to execute the programmatic instructions to enable the clinician to remotely initiate and conduct a video call to a patient.

5. The system of claim 1, wherein, when executed by the processor, the programmatic instructions mirror the display of the at least one head mounted vision assessment device on the clinician's at least one computing device by causing a display of one or more predefined variables corresponding to the patients' medical condition.

6. The system of claim 5, wherein, when executed by the processor, the programmatic instructions receive modifications to the displayed one or more predefined variables from the clinician's computing device and cause corresponding modifications to the one or more predefined variables in the at least one head mounted vision assessment devices in real time.

7. The system of claim 6, wherein the corresponding modifications to the one or more predefined variables in the at least one head mounted vision assessment devices are experienced by one or more of the patients in real-time and are mirrored to the at least one computing device in real time in order to be seen by the clinician.

8. The system of claim 1, wherein, when executed by the processor, the programmatic instructions automatically adjust at least one of a type of a diagnostic test or a frequency of a diagnostic test presented to patients based upon results of the one or more diagnostic tests.

9. The system of claim 1, wherein, when executed by the processor, the programmatic instructions generate notifications and cause the notifications to be transmitted to the clinician based upon results of the one or more diagnostic tests indicating vision changes in the patients.

10. The system of claim 1, wherein at least one of the diagnostic tests comprise an environmental test to determine light exposure in the patients' surroundings.

11. The system of claim 1, wherein, when executed by the processor, the programmatic instructions cause said results of one or more diagnostic tests conducted by the one or more patients using the at least one head mounted vision assessment devices to be automatically transmitted to the at least one computing device at predefined intervals.

12. The system of claim 1, wherein, when executed by the processor, the programmatic instructions mirror displays associated with the at least one head mounted vision assessment devices on the at least one computing device to enable the clinician to monitor each of the patients' field of view in real-time.

13. The system of claim 1, wherein, when executed by the processor, the programmatic instructions mirror displays associated with the at least one head mounted vision assessment devices on the at least one computing device to enable the clinician to monitor what the patients experienced in their fields of view at an earlier point in time.

14. The system of claim 1, wherein the clinician's computing device is located remote to the location of the at least one head mounted vision assessment device.

15. The system of claim 1, wherein the server computer and/or the at least one computing device receive data from at least one head mounted vision assessment device.

16. A method for assessing vision of one or more patients using a vision assessment system, wherein the vision assessment system comprises at least one head mounted vision assessment devices coupled with at least one computing device adapted to be used by a clinician via a server computer communicatively coupled with the at least one head mounted of vision assessment devices and the at least one computing device, the method comprising:
  presenting one or more diagnostic tests to each of the one or more patients via the at least one head mounted vision assessment device;
  receiving results of the one or more diagnostic tests presented to each of the one or more patients;
  causing a display of the at least one head mounted vision assessment device to be mirrored on the at least one computing device;
  receiving an assessment of the vision of the one or more patients based on at least one of: the results of the one or more diagnostic tests and the mirrored display; and
  receiving at least one of a prescription, an instruction or a therapy based on the assessment.

17. The method of claim 16 wherein the clinician's computing device is located remote to one or more patient locations and a location of the server computer.

18. The method of claim 16 further comprising setting by the clinician consultation appointments; modifying the appointments; and canceling the appointments, remotely.

19. The method of claim 16 further comprising the clinician remotely making a video call to a patient for diagnosing the patient.

20. The method of claim 16 wherein mirroring the display of the at least one head mounted vision assessment device on the clinician's computing device comprises displaying one or more predefined variables corresponding to a each of the one or more patients' medical condition for evaluation by the clinician.

21. The method of claim 19 wherein changes made to the displayed variables by the clinician cause corresponding changes to be made in real time in the display of the at least one head mounted vision assessment device.

22. The method of claim 20 wherein the changes in the display of the at least one head mounted vision assessment device made in real time are seen by the clinician via the mirroring of the display of the at least one head mounted vision assessment device on the at least one computing device, and wherein the clinician diagnoses each of the one or more patients based on said changes.

23. The method of claim 16 further comprising automatically adjusting at least one of: a type or frequency of a diagnostic test conducted by a patient if a result of the one or more diagnostic tests conducted by the patient indicates a condition change in the patient.

24. The method of claim 16, wherein the clinician's computing device is located remote to the location of the at least one head mounted vision assessment device.

25. The method of claim 16, wherein the server computer and/or the at least one computing device receive data from at least one head mounted vision assessment device.

26. A method for managing a plurality of head mounted vision assessment devices located at a plurality of patient locations, wherein the method is performed by at least one server is located remote to the plurality of patient locations, wherein the server computer is at least periodically communicatively coupled with each of the head mounted vision assessment devices and wherein the server computer comprises a processor and is coupled with a non-transient memory comprising programmatic instructions, the method comprising:
  presenting one or more diagnostic tests to a plurality of patients located at the plurality of patient locations via the plurality of head mounted vision assessment devices;
  receiving results of the one or more diagnostic tests presented to the plurality of patients located at the plurality of patient locations;
  generating data representative of displays associated with each of the plurality of head mounted vision assessment devices and causing said displays to be mirrored on at least one computing device to enable a clinician to monitor each of the plurality of patients' fields of view;
  receiving an assessment of each of the plurality of patients' vision based on at least one of: the results from the one or more diagnostic tests or the mirrored displays of the plurality of patients' fields of view; and
  receiving at least one of a prescription or an instruction to perform a therapy based on the assessment.

27. The method of claim 26, wherein the at least one computing device is located remote to the location of the server computer and wherein at least some of the plurality of patient locations are located remote from each other.

28. The method of claim 26, wherein the processor is further programmed to execute the programmatic instructions to enable the patients and the clinician to remotely schedule consultation appointments, modify scheduled appointments, and/or cancel scheduled appointments.

29. The method of claim 26, wherein the processor is further programmed to execute the programmatic instructions to enable the clinician to remotely initiate and conduct a video call to a patient.

30. The method of claim 26, wherein, when executed by the processor, the programmatic instructions mirror displays associated with each of the plurality of head mounted vision assessment devices on the at least one computing device by causing a display of one or more predefined variables corresponding to the patients' medical condition.

31. The method of claim 30, wherein, when executed by the processor, the programmatic instructions receive modifications to the displayed one or more predefined variables from the at least one computing device and cause corresponding modifications to the one or more predefined variables in one or more of the plurality of head mounted vision assessment devices in real time.

32. The method of claim 31, wherein the corresponding modifications to the one or more predefined variables in one or more of the plurality of head mounted vision assessment devices are experienced by the plurality of patients in real-time and are mirrored to the at least one computing device in real time in order to be seen by the clinician.

33. The method of claim 26, wherein, when executed by the processor, the programmatic instructions automatically adjust at least one of a type of a diagnostic test or a frequency of a diagnostic test presented to plurality of patients based upon results of the one or more diagnostic tests.

34. The method of claim 26, wherein, when executed by the processor, the programmatic instructions generate notifications and cause the notifications to be transmitted to the at least one computing device based upon results of the one or more diagnostic tests indicating vision changes in the patients.

35. The method of claim 26, wherein at least one of the diagnostic tests comprise an environmental test to determine light exposure in the patients' surroundings.

36. The method of claim 26, wherein, when executed by the processor, the programmatic instructions cause said results of one or more diagnostic tests conducted by the plurality of patients at the plurality of patient locations using the plurality of head mounted vision assessment devices to be automatically transmitted to the at least one computing device at predefined intervals.

37. The method of claim 26, wherein, when executed by the processor, the programmatic instructions mirror displays associated with the plurality of plurality of head mounted vision assessment devices on the at least one computing device to enable the clinician to monitor each of the plurality of patients' field of view in real-time.

38. The method of claim 26, wherein, when executed by the processor, the programmatic instructions mirror displays associated with the plurality of head mounted vision assessment devices on the at least one computing device to enable the clinician to monitor what each of the plurality of patients experienced in their fields of view at some earlier point in time.

39. The method of claim 26, wherein the at least one computing device is located remote to the location of the plurality of head mounted vision assessment devices.

40. The method of claim 26, wherein the server computer and/or the at least one computing device receive data from the plurality of head mounted vision assessment devices.

* * * * *